Sept. 3, 1963

C. V. STOCK ETAL 3,102,371

AUTOMATIC CUTTER GRINDER

Filed March 14, 1960

INVENTORS
CARL V. STOCK
HOWARD H. BRELSFORD
EUGENE R. FERGUSON

BY
ATTORNEYS

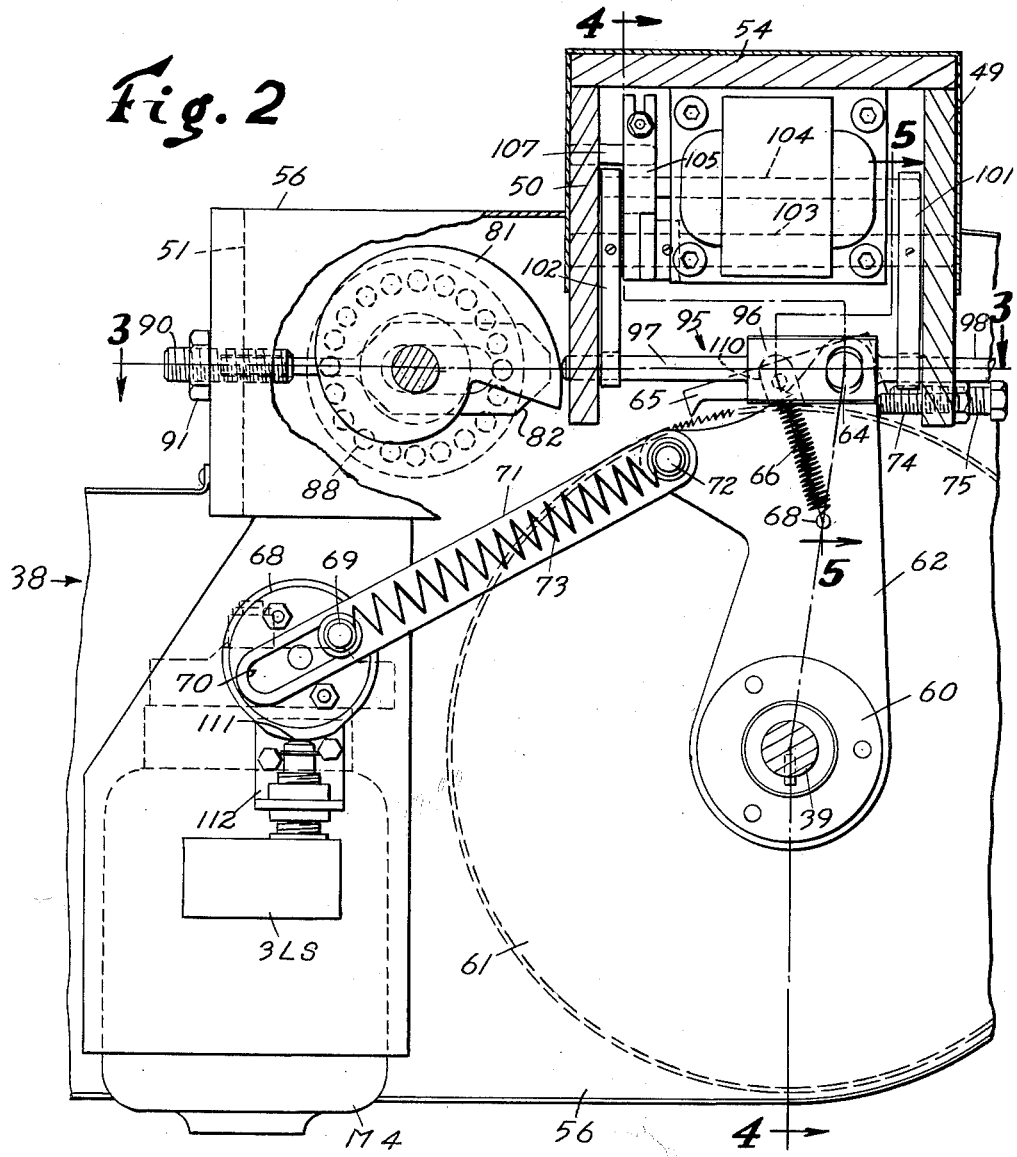

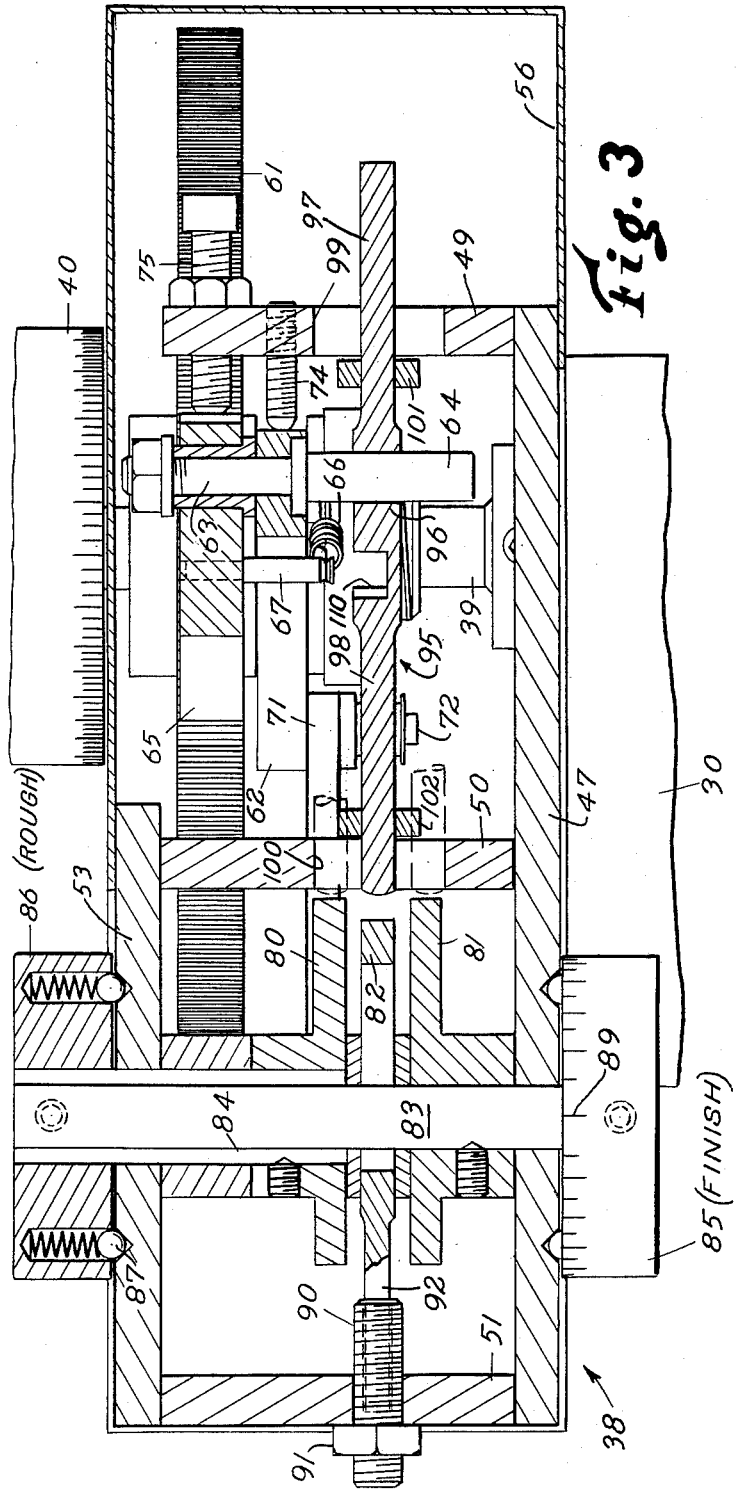

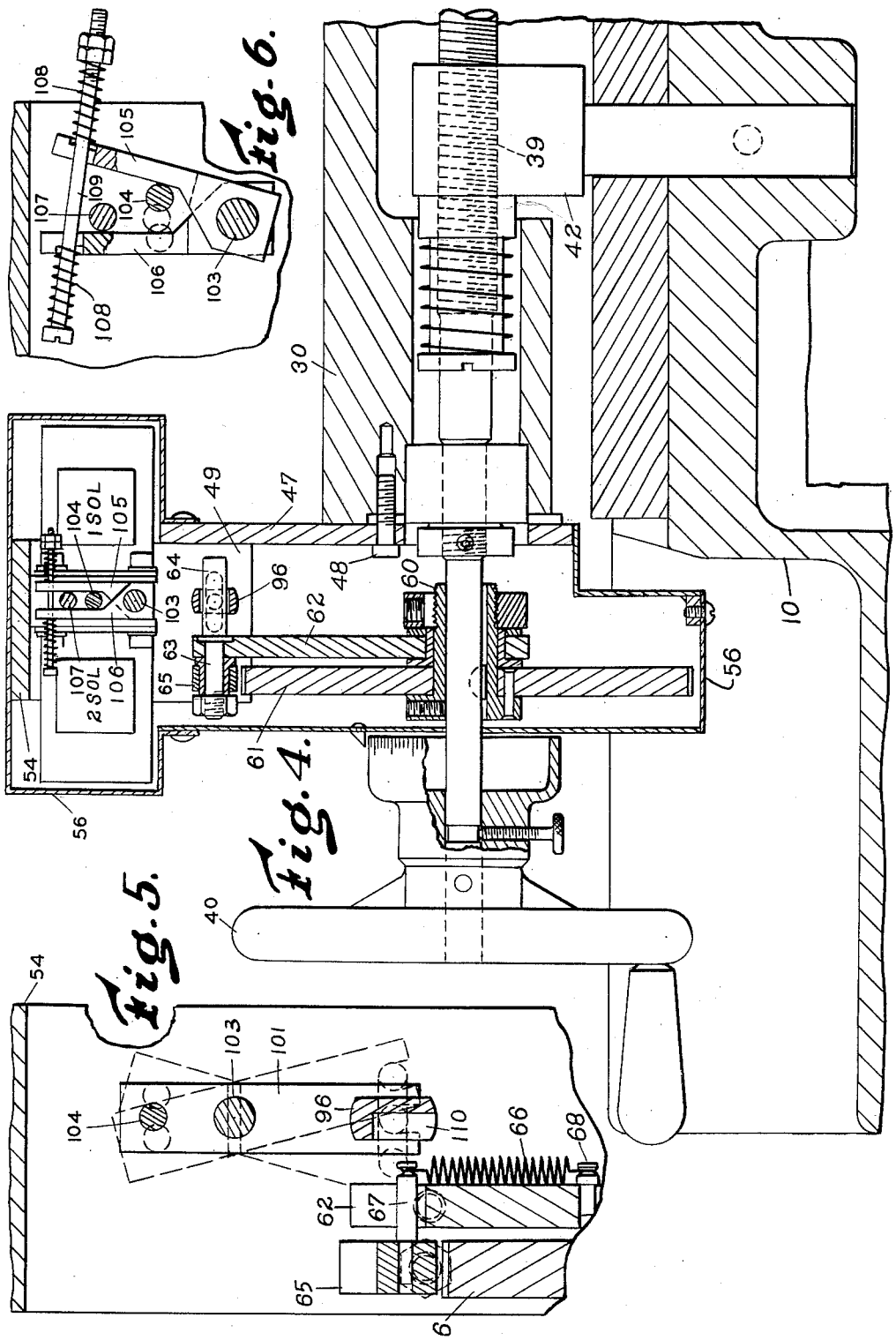

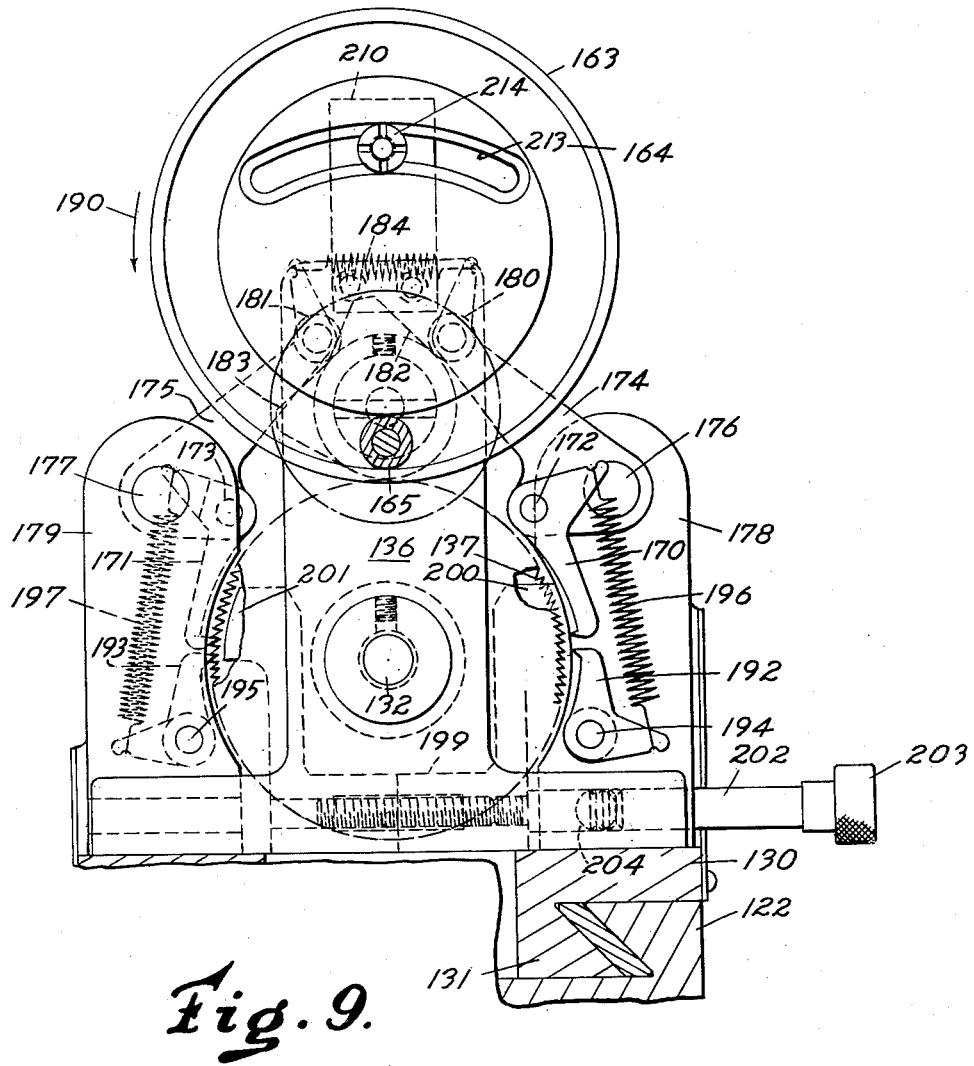

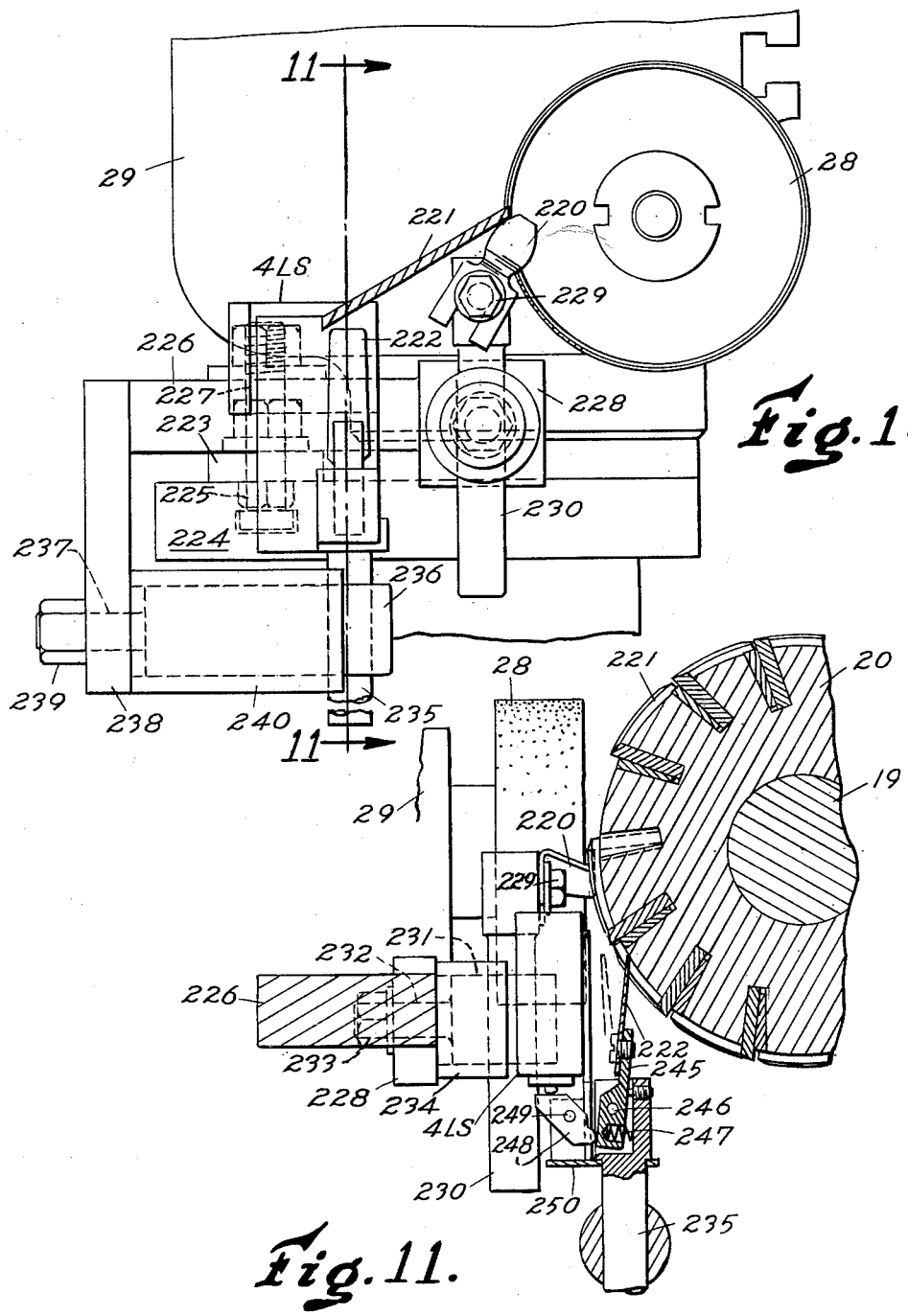

United States Patent Office 3,102,371
Patented Sept. 3, 1963

3,102,371
AUTOMATIC CUTTER GRINDER
Carl V. Stock, Cincinnati, Howard H. Brelsford, Norwood, and Eugene R. Ferguson, Cincinnati, Ohio, assignors to The Cincinnati Milling Machine Co., Cincinnati, Ohio, a corporation of Ohio
Filed Mar. 14, 1960, Ser. No. 14,895
19 Claims. (Cl. 51—123)

This invention relates to an automatic cutter grinder which is adapted to rough and finish grind the teeth of helical, stagger or plain tooth cutters in a single, continuous, automatic cycle of operation. In accordance with the present invention, the setting of the machine preparatory to grinding a cutter of a particular type and size is very considerably simplified since, after the cutter has been mounted in the machine with the toothrest in place, it is merely necessary to adjust knobs of the various selector switches and counters to determine the type of automatic cycle desired. When a group of identical cutters are to be sharpened, the operator's duty consists merely of loading and unloading the machine and depressing a cycle start push-button to initiate the automatic grinding cycle. The entire operation is preformed automatically in a single, continuous cycle which also includes automatic truing of the grinding wheel at preselected intervals to maintain a sharp, accurate cutting face thereon.

In the past, very few attempts have been made to completely automate a cutter grinder, since, being a tool room type machine, it must possess sufficient flexibility and versatility to handle the many different types and sizes of cutters which require sharpening. One approach to a completely automatic machine for grinding cutters is that shown in U.S. Patent No. 2,840,958, granted July 1, 1958, on an application filed by C. E. Waller and entitled "Automatic Cutter Grinder." According to this patent, a basic cutter grinder of the type shown in U.S. Patent No. 1,975,947, granted October 9, 1934, to H. R. Isler et al., is provided with automatic means for indexing the cutter and for traversing the cutter back and forth across the face of the grinding wheel. It does not make provision, however, for pickfeeding the cutter toward the grinding wheel or for truing the wheel and automatically compensating for the amount of material removed therefrom by the truing diamond. These features must, of course, be provided in any cutter grinder which is to be fully automatic in its operation.

It is, therefore, an object of the present invention to provide a cutter grinder which will completely grind a cutter in a single, continuous automatic cycle of operation.

Another object of the invention is to provide an automatic cutter grinder which will rough grind and finish grind the cutter teeth in the course of an automatic cycle, and which will permit as many rough grind and finish grind revolutions of the cutter to be effected in the course of the cycle as may be necessary or desirable.

Another object of the invention is to provide an apparatus to automatically rough and finish grind the teeth of a cutter and also to finish off the grinding operation with a spark out grind after the last finish grind revolution of the cutter.

Another object of the invention is to provide a cutter grinder of the automatic cycling type which will automatically index the cutter through 180° after each rough grind revolution to effect rounding up of the cutter.

Another object of the invention is to provide, in an automatic cutter grinder, a truing and compensating mechanism which can be selected for operation at any point in the automatic cycle without stopping and restarting the cycle.

Another object of the invention is to provide, in an automatic cutter grinder, a pickfeed unit comprised of a plurality of preselected elements which may be selected to control the advance of a slide through different distances in accordance with the settings of the elements.

Another object of the invention is to provide a control system in which a repeat cycle is prevented until after the counters have been reset and prepared for a succeeding automatic cycle of operation.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of the specification.

In the drawings:

FIG. 2 is a cross-sectional view taken along the line 2—2 in FIG. 1.

FIG. 3 is a cross-sectional view taken along the line 3—3 in FIG. 2.

FIG. 4 is a cross-sectional view taken along the line 4—4 in FIG. 2.

FIG. 5 is a cross-sectional view taken along the line 5—5 in FIG. 2.

FIG. 6 is a detail view showing certain of the parts in FIG. 4 in a moved position.

FIG. 9 is a cross-sectional view taken along the line 9—9 in FIG. 7.

FIG. 10 is a front elevation partly in cross-section, showing the relation between the cutter teeth and the toothrest.

FIG. 11 is a cross-sectional view taken along the line 11—11 in FIG. 10.

FIGS. 12a–12h, inclusive, are wiring diagrams of the electrical circuits which serve to control the operation of the machine during the automatic cycle.

Figure 1:
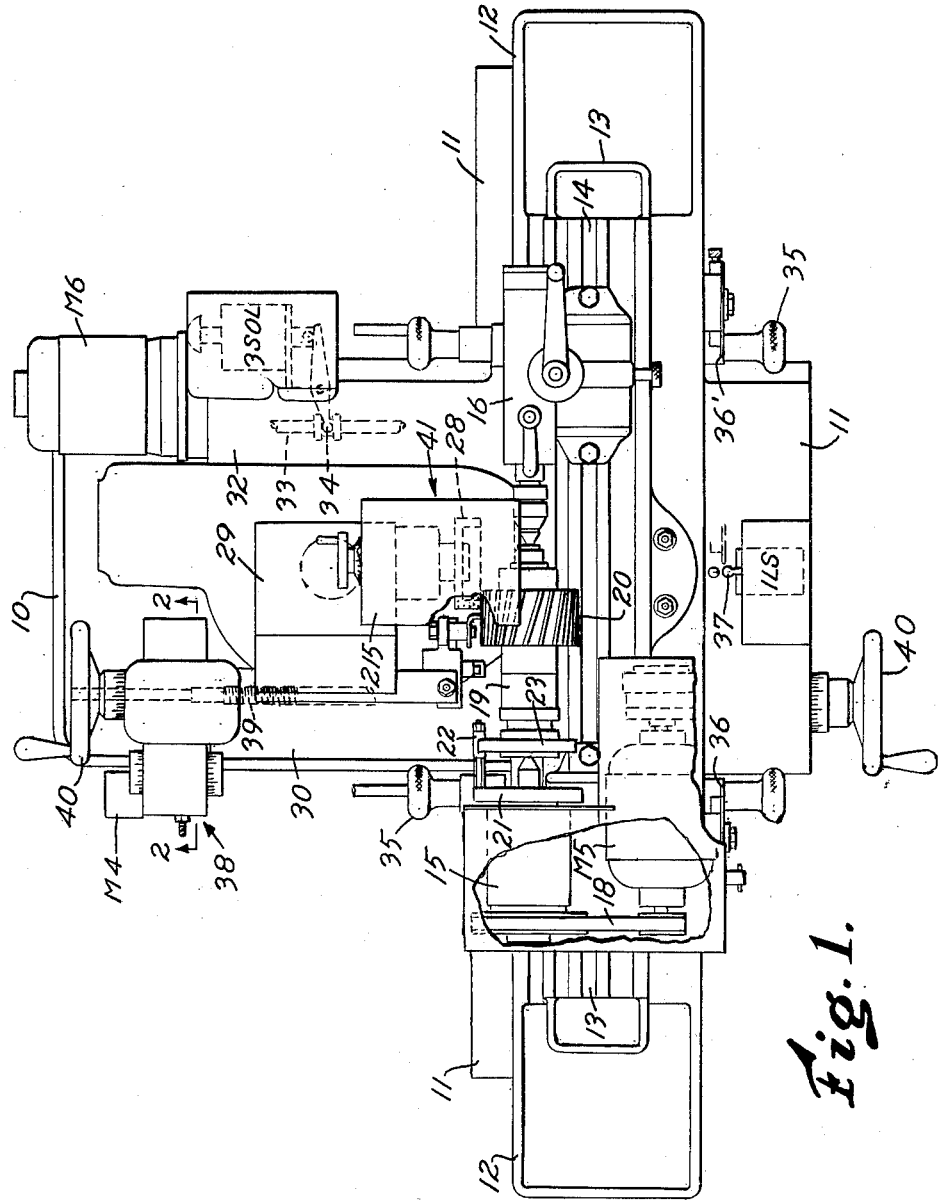
FIG. 1 is a plan view of an automatic cutter grinder constructed in accordance with the teachings of the present invention.

The automatic cutter grinder shown in the accompanying drawings embodies the same basic machine tool structure as that shown in U.S. Patent No. 1,975,947 mentioned above and reference may be made to this patent for a detailed disclosure of the machine tool per se. FIG. 1 of the present drawings shows the structural arrangement of the equipment which has been added to the basic machine to convert it into a fully automatic cutter grinder. The electrical equipment which controls the operation of the machine during the automatic cycle is housed in an electrical cabinet (not shown) having a control panel on which the selector switches, pushbuttons and counters are mounted so as to be readily accessible to the operator of the machine. These components, together with their associated relays, limit switches, etc., are diagrammatically illustrated in the wiring diagram which comprises FIGS. 12a to 12h of the present drawings.

Referring to FIG. 1 of the drawings, the machine tool includes a hollow, box-like bed 10 which is provided on its upper surface with a pair of horizontal ways extending from front to rear on which a saddle 11 is mounted for sliding movement. The saddle, in turn, is provided on its upper surface with a pair of horizontal ways extending at right angles to those on the bed on which a table slide 12 is mounted. A table 13 is secured to the slide 12 and is provided on its upper surface with longitudinally extending T-slots 14 so as to permit a workhead 15 and a tailstock 16 to be adjustably fastened thereto. The workhead is arranged to be driven by an electric torque motor M5 through a belt 18 and suitable pulleys on the motor and workhead. The workhead and tailstock are fitted with centers for supporting the opposite ends of an arbor 19 on which is mounted the cutter 20 to be ground. The workhead spindle carries a face plate 21 to which is secured a pin 22 that is adapted to engage in a notch formed in a plate 23 secured to the arbor 19. Torque supplied to the workhead by motor M5 is thereby transmitted to the cutters through the pin 22 and plate 23.

Grinding of the cutter is effected by a cup-shaped grinding wheel 28 carried by a spindle supported for rotation in a wheelhead 29. The wheelhead is suitably mounted on the bed 10 for vertical and pivotal adjustments and the grinding wheel spindle is arranged to be driven by an electric motor (not shown).

The saddle 11 is provided with rearward extensions 30 and 32 which contain guides adapted to cooperate with the ways mounted on the bed as above mentioned. Mounted on the rear end of extension 32 is an electric table drive motor M6 which is geared to a shaft 33 housed within the extension. At its forward end, the shaft is provided with a pinion (not shown) which meshes with a rack secured to the underside of the table slide 12 to provide a power drive to the table. The power drive to the table is adapted to be selectively disengaged by a solenoid 3SOL which, when energized, operates a shifter fork 34 and shifts the shaft 33 rearwardly thereby disengaging the pinion on the shaft from the rack on the table slide.

When solenoid SOL3 is energized, manual movement of the table can be effected by rotation of handwheels 35 which are connected to pinions meshing with the rack on the table slide. Thus, when it is desired to set adjustable stop dogs 36 on the table slide relative to the operating lever 37 of limit switch 1LS fixed to the saddle, the table may be moved to the desired end positions by means of handwheels 35 after which the dogs may be adjusted to the correct location on slide 12 to operate the limit switch 1LS at these points.

Mounted on the rear end of the extension 30 is a pickfeed unit 38 which will be more fully described hereinafter. This unit is driven by an electric motor M4 which provides selected, predetermined increments of rotary movement to a feed screw 39. This screw is fitted at each end with a handwheel 40 and is journaled in the saddle for rotation either by the handwheels or by the pickfeed unit. The screw 39 cooperates with a nut 42 (FIG. 4) secured to the bed 10 so that rotation of the screw effects feeding movement of the saddle along the ways provided on the bed.

The wheelhead 29 is provided with a truing unit 41 which includes a diamond truing bar, a motor for reciprocating the bar, and a pickfeed unit for feeding the bar toward the grinding wheel after each reciprocation thereof. This unit, like the pickfeed unit 38, will be described in greater detail in a subsequent portion of this specification.

The manner in which the saddle pickfeed unit is constructed is shown in FIGS. 2-6, inclusive. As best shown in FIGS. 3 and 4, the pickfeed mechanism is supported on a plate 47 which is fastened by screws 48 to the rear end of the saddle extension 30. This plate is apertured to receive the feed screw 39 which passes through the pickfeed unit and extends to the rear thereof where it is provided with the handwheel 40.

As shown in FIG. 3, the plate 47 has secured thereto additional frame plates 49, 50, 51 and 53 which provide support for the various elements of the pickfeed mechanism. As seen in FIGS. 2 and 4, the plates 49 and 50 are surmounted by a horizontal plate 54 which provides support for solenoids 1SOL and 2SOL which, when energized, select finish and rough pickfeed, respectively. A sheet-metal casing 56 attached to the frame plates serves to enclose the pickfeed unit and protect it from damage.

Referring now to FIG. 4, a hub 60 is keyed to the rearward extension of the feedscrew 39 within the confines of the casing 56. Secured to the hub is a ratchet wheel 61 which is thus constrained to rotate in unison with the feed screw 39. Mounted on the hub adjacent the ratchet wheel is a pawl arm 62 supported for rotation on the bushing in spaced relation to the ratchet wheel 61. Secured to the upper end of the arm 62 is a screw stud 63 which is provided on its right hand end (as viewed in FIG. 4) with an extension pin 64. Pivotally journaled on the stud 63 is a pawl 65 which is urged toward engagement with the teeth of the ratchet wheel by a tension spring 66 (FIG. 2) stretched between a spring stud 67 (FIG. 3) on the pawl and a stud 68 on the pawl arm 62.

Oscillation of the pawl arm 62 is effected by the pickfeed motor M4 (FIG. 2) which drives a plate cam 68 through conventional reduction gearing and a right angle drive. Projecting from the face of the cam 68 is an eccentric stud 69 which is received within a slot 70 provided in one end of a link 71. The opposite end of the link is pivotally connected to the pawl arm 62 by a pivot stud 72. A tension spring 73 stretched between the studs 69 and 72 tends to maintain the stud 69 in contact with the inner end of the slot 70 as shown in FIG. 2.

With the parts positioned as shown in FIG. 2, the stud 69 lies on a line connecting the center of the cam 68 with the stud 72 so that the pawl arm 62 is at the limit of its travel in a clockwise direction. In this position of the arm, it is contacted by a set screw 74 (see also FIG. 3) which prevents any over travel of the arm due to stretching of the spring 73. As also shown in FIG. 2, the pawl 65 is held out of engagement with the teeth on the ratchet wheel by a bolt 75 which, like the set screw 74 is mounted in the plate 49 and is adapted to engage the tail of the pawl when the arm 62 moves into its extreme right hand position thereby stretching the spring 66 and lifting the pawl out of contact with the teeth. This is for the purpose of permitting manual rotation of the feed screw 39 by the handwheels 40 when the pickfeed mechanism is in its home position as illustrated in FIG. 2.

On each revolution of the cam 68, the pawl arm 62 will be given an excursion first counterclockwise from the position shown in FIG. 2 and then returned clockwise to the home position as shown. The extent of this excursion will depend upon the amount of movement permitted the cam arm 62 either by a rough pickfeed cam 80, a finish pickfeed cam 81, or a truing pickfeed stop 82 (FIG. 3). In the present embodiment of the invention, the cams 80 and 81 are identical in shape and, as shown in FIG. 2, have the form of snail cams. As shown in FIG. 3, the cam 81 is secured to a shaft 83 while the cam 80 is secured to a sleeve 84 telescoped over the shaft. Positioning of the cam 81 is effected by a drum type dial 85 secured to the shaft 83 while positioning of the cam 80 is effected by a similar dial 86 secured to the sleeve 84. Both dials carry spring pressed balls 87 which are adapted to engage in recesses 88 (see also FIG. 2) provided in the outer surfaces of plates 47 and 53 to provide detenting of the dials and cams to hold them in adjusted positions. The dials 85 and 86 are provided with graduations 89 which may, for example, read directly in inches of pickfeed, the cams 80 and 81 preferably being so dimensioned as to provide a range of pickfeeding movement extending from .00025 inch to .005 inch of movement of the saddle.

The stop 82 which controls the truing pickfeed movement of the saddle is in the form of a slotted plate which embraces the shaft 83 and is provided with a cylindrical extension 92. This extension is received in a socket formed in the end of an adjustment bolt 90 which is threaded through the plate 51 and provided with a lock nut 91 to hold the bolt and the stop 82 in adjusted position.

Control of the movement of the pawl arm 62 by the cams 80 and 81 and the stop 82 is effected by a pitman 95 having an enlarged central portion 96 and oppositely extending rod portions 97 and 98. The rod portions 97 and 98 pass through horizontally extending slots 99 and 100 in the frame plates 49 and 50, respectively, while the central portion 96 is apertured to receive the pin 64 formed on the stud 63.

The pitman is adapted to be vertically guided and positioned by a pair of arms 101 and 102 (FIGS. 2 and 5) which are secured to opposite ends of a shaft 103 journaled in the plates 49 and 50. The lower end of each arm is notched to receive its associated rod portion 97 or 98 while at their upper ends the arms are connected by a cross rod 104 which is operated upon by the solenoids to adjust the positions of the arms and thereby the pitman. As shown in FIG. 4, the solenoids 1SOL and 2SOL lie on opposite sides of the rod 104 and the armatures of the solenoids (not shown) are arranged to abut against opposite sides of the rod so that when solenoid 1SOL is energized it will push rod 104 to the left and conversely when solenoid 2SOL is energized it will push the rod to the right as viewed in FIG. 4. A pair of centering arms 105 and 106 are journaled on the shaft 103 and are resiliently urged toward one another and into contact with a stop stud 107 mounted in the plate 50 (FIG. 2) by a pair of compression springs 108 (FIG. 6) carried by a bolt 109. Hence, when both solenoids are deenergized, the spring arms 105 and 106 will center the rod 104 as shown in FIG. 4 thereby locating the pitman 95 in its centered position where it is aligned with the truing stop 82 (FIG. 3). However, when the solenoid 1SOL is energized, the rod 104 will be moved to the left as viewed in FIG. 4 thereby moving the pitman toward the right so as to move it into alignment with the finish pickfeed cam 81. If, on the other hand, the solenoid 2SOL is energized, the rod 104 will be moved to the right as viewed in FIG. 4 thereby moving the pitman to the left so as to bring it into alignment with the rough pickfeed cam 80. A clearance notch 110 (FIG. 3) is cut in the central portion 96 of the pitman to accommodate the spring stud 67 and upper end of spring 66 when the pitman is moved into alignment with the rough pickfeed cam 80.

As shown in FIG. 2, the cam 68 driven by the pickfeed motor M4 has a cam nose 111 formed thereon which is adapted to engage the plunger of a limit switch 3LS supported on a frame bracket 112 in a position adjacent to the cam. When the pickfeed mechanism is in its home position as shown in FIG. 2, the nose of the cam is on the limit switch and holds it operated at this time. As will be described hereinafter in connection with the wiring diagram, the operation of limit switch 3LS by the cam 68 controls the energization of the motor M4 and stops the motor after the cam has made one complete revolution.

*Truing Unit*

Figure 8:
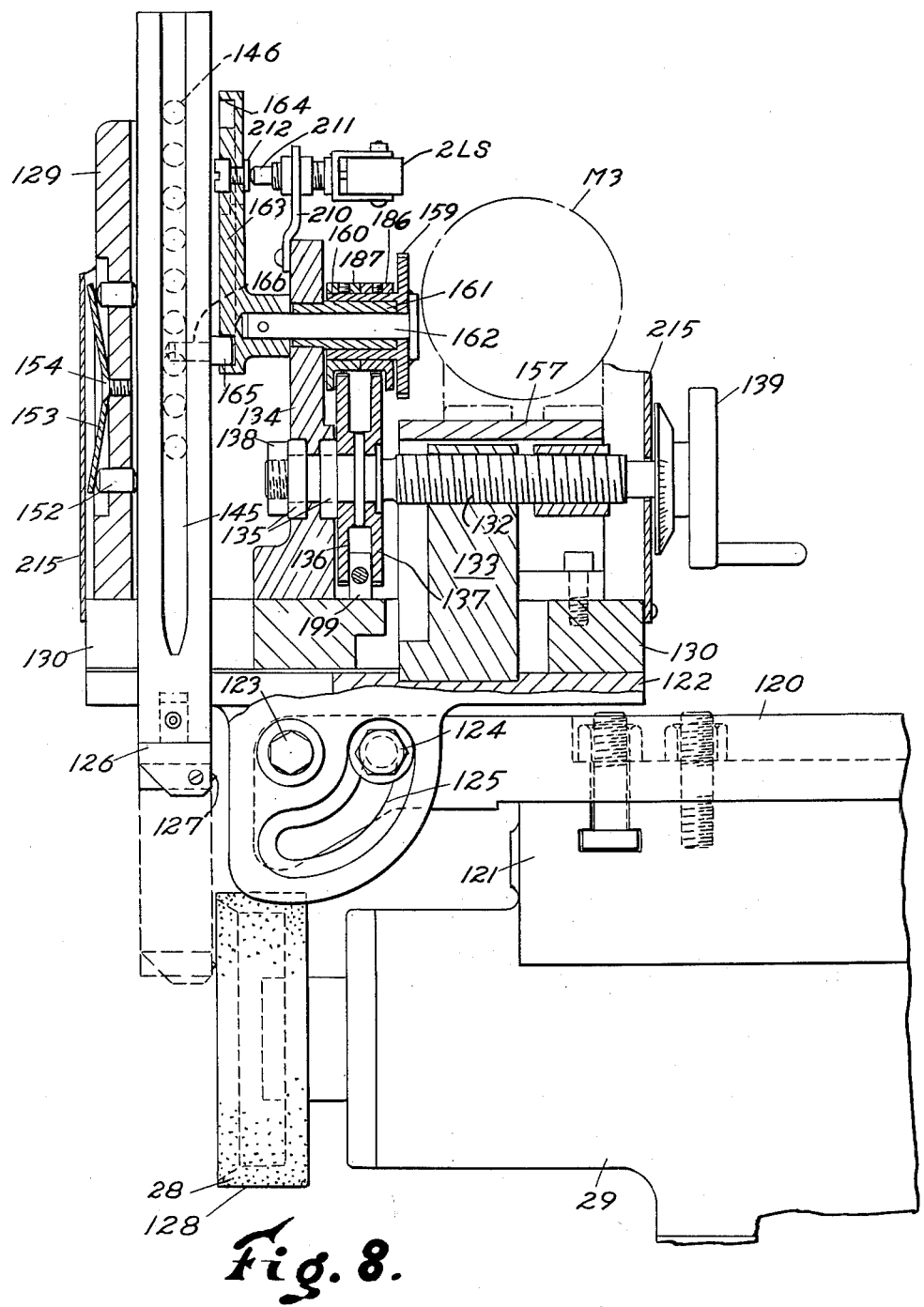
FIG. 8 is a cross-sectional view taken along the line 8—8 in FIG. 7.

As shown in FIG. 8, the truing unit is mounted on the wheelhead 29 so as to lie directly over the grinding wheel 28. For this purpose, a base plate 120 is bolted to a mounting pad 121 on the wheelhead, the saddle 122 of the truing unit being pivotally supported on the base plate by pivot bolts 123 and clamping bolts 124 received in an arcuate slot 125 formed in the saddle. With this arrangement it is possible to loosen the clamp bolts 124 and rotate the truing unit 90° counterclockwise about the pivot bolts 123. In this position of the unit, it is observed that the diamond truing bar 126 thereof which carries a truing diamond 127 will lie with its axis parallel to the peripheral face 128 of the grinding wheel to permit truing of this surface of the wheel if desired.

The truing bar 126 is mounted for reciprocatory movement in a ball-way housing 129 which is mounted on the forward end of a slide 130 which is guided for reciprocatory movement on the saddle 122 by dovetail guides or ways 131 (FIG. 9).

Movement of the slide relative to the saddle is effected by a lead screw 132 which is threaded into a nut block 133 secured to the saddle 122 as shown in FIG. 8. At its forward end, i.e., at its left hand end as viewed in FIG. 8, the lead screw 132 is supported in a frame member 134 secured to the slide 130. The support provided for the lead screw is such as to permit rotation thereof while preventing longitudinal movement of the screw relative to the frame member 134. This is effected by a pair of ball thrust bearings 135 which are retained in recesses formed in the member 134 by a ratchet wheel assembly 136, 137 pinned to the lead screw, and by a nut 138 screwed onto the lefthand end thereof. Hence, when the lead screw is rotated either by means of the ratchet wheels 136 and 137 or by the hand wheel 139, the slide 130 will be fed along the saddle 122.

Figure 7:
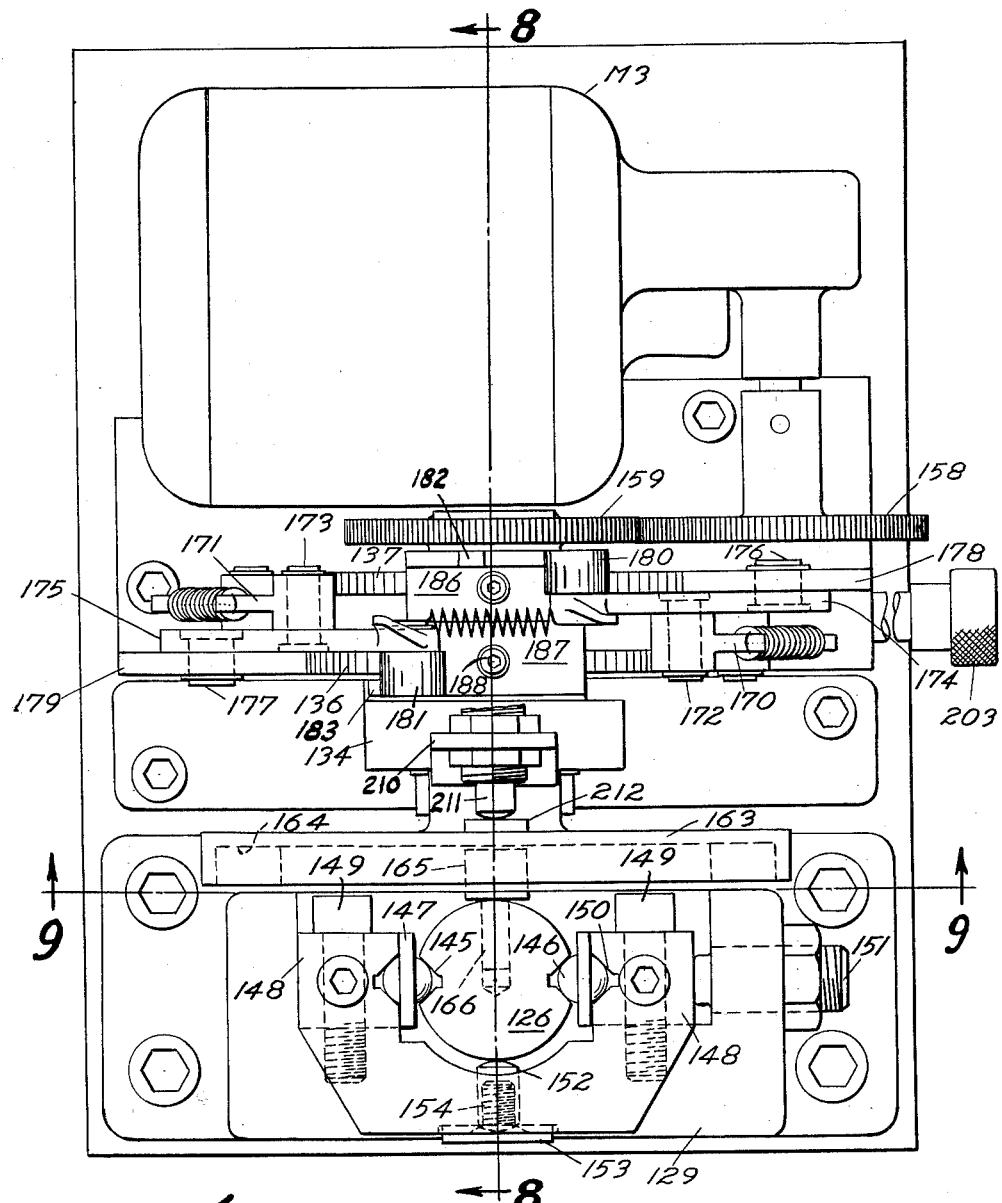
FIG. 7 is a plan view of the grinding wheel truing mechanism.

The manner in which the truing bar is supported for longitudinal sliding movement in the ball-way housing 129 is best shown in FIG. 7. It will be seen that the bar 126 is provided with a pair of longitudinally extending V-shaped grooves 145 which form tracks for a series of balls 146 which are held in spaced-apart relation by cage strips 147. A pair of rails 148 are secured to the housing 129 by bolts 149, these rails containing grooves 150 which form the complementary portion of the tracks for balls 146. Adjustment screws 151 provide a means for taking up lost motion between the balls and the grooves 145 and 150, and, in addition, a constant spring bias is applied to the bar urging it rearwardly as viewed in FIGS. 7 and 8 so as to load the bearings and prevent any lost motion between the bar 126 and the tracks 148. As best shown in FIG. 8, the last mentioned means includes a pair of pins 152 which are slidably received in holes provided therefor in the ball housing 129 and are spring urged into engagement with the front face of the bar 126 by a leaf spring 153 held in place by a screw 154.

Reciprocation of the truing bar is effected by a truing drive motor M3 which is supported on a frame plate 157 carried by the slide 130. Referring to FIG. 7, the motor M3 drives a gear 158 through a suitable speed reduction drive mechanism, the gear 158 meshing with a companion gear 159. The latter gear is formed with a hub 160 (FIG. 8) which is journaled on a bushing 161 secured to the frame member 134. The gear 159 is secured to a shaft 162 which is journaled in the bushing 161 and has secured to its opposite end an eccentric drive plate 163. This plate is provided with a circular groove 164 which is engaged by a roll 165 carried by a pin 166 secured to the truing bar 126. Therefore, when the motor M3 is energized, the shaft 162 will be rotated and revolve the plate 163 about the axis of shaft 162 whereby the bar 126 will be given one complete reciprocation for each revolution of the shaft 162.

The truing unit is provided with a pickfeed mechanism for advancing the truing bar toward the grinding wheel at the end of each reciprocation of the bar. This mechanism includes a pair of feed pawls 170 and 171 (FIG. 9) which are adapted to engage with the ratchet wheels 136 and 137, respectively. The pawls are pivotally mounted on studs 172 and 173 carried by operating arms 174 and 175. These arms are in turn pivoted on studs 176 and 177 carried by frame supports 178 and 179. Each operating arm is provided at its upper end with a bearing stud on which is journaled a roll 180 and 181 which are urged into engagement with plate cams 182 and 183 by a common tension spring 184 stretched between spring tabs formed on the upper ends of the arms. The cams 182 and 183 are carried by hubs 186 and 187 (FIG. 7) which are secured to the hub 160 (FIG. 8) of the gear 159 by set screws 188. Hence, when the drive plate 163 (FIG. 9) is rotated in the direction of the arrow 190, the cams will move away from the rolls 180 and 181 and will not reengage with the rolls until near the end of the up stroke of the truing bar when they will move beneath the rolls and move the pawls 170 or 171 upwardly to advance the feed screw 132 a predetermined amount. A pair of retaining pawls 192 and 193 are pivoted on studs 194 and 195 mounted in the supports 178 and 179. Tension springs 196 and 197 stretched between tails on pawls 170 and 192, and 171 and 193 urge the pawls into engagement with the ratchet wheels.

In order to determine which set of pawls shall be effective, there is provided a slide 199 having upstanding masking portions 200 and 201 which lie between the spaced ratchet wheels. The slide 199 is provided with an operating rod 202 to the end of which is secured a hand knob 203. Spring urged detent means 204 is provided for holding the slide 199 either in the position shown in FIG. 9 in which the mask 200 holds pawls 170 and 192 out of engagement with the ratchet wheel 136, or in the position in which these pawls are released and pawls 171 and 193 are held out of engagement with ratchet wheel 137 by the mask 201. Hence, by suitable positioning of the slide 199 the truing bar slide 130 may be picked a predetermined amount in either direction at the end of each reciprocation of the truing bar.

The truing unit includes a limit switch 2LS (FIG. 8) which is mounted on a bracket 210 secured to the frame member 134. The plunger 211 of the limit switch is adapted to be depressed by a button 212 formed by the head of a screw which is held in adjusted position in a slot 213 (FIG. 9) in the drive plate 163 by a nut 214. As will be explained hereinafter in connection with the electrical diagrams, the limit switch 2LS controls the cycling of the electric motor M3.

The truing unit is preferably enclosed within a protective casing 215 which is fastened to the slide 130 as shown in FIG. 8.

Index Toothrest

In accordance with conventional cutter grinder practice, a fixed toothrest 220 (FIGS. 10 and 11) is attached to the wheelhead 29 and serves as a support for each cutter tooth 221 as it is being ground. In FIG. 11 one tooth 221 has been omitted from the cutter for the sake of illustrating this feature more clearly. As shown in FIG. 10, the toothrest contacts the underside of the tooth 221 at a point opposite the grinding face of the wheel 28 so as to effect a true and accurate grind on the edge of the tooth as the cutter is traversed with the table past the grinding wheel. When the tooth 221 leaves the fixed tooth rest at the end of the left hand travel of the table it passes onto an index tooth rest 222 which supports the tooth after it has left the fixed toothrest and controls the indexing of the cutter in a manner which will be more fully explained hereinafter in connection with the wiring diagram.

As shown in the present embodiment of the invention, both toothrests are supported from the wheelhead 29 by means of a bar 223 (FIG. 10) which is secured to a flange 224 on the wheelhead by means of bolts 225 engaging in T-slots formed in the flange. Secured to the forward end of the bar 223 is a bracket 226 which is clamped to the bar 223 by bolts 227. As shown in FIG. 10, the bracket 226 has a right hand extension on which is formed a clamping head 228. The fixed toothrest 220 is held by a bolt 229 on the upper end of a post 230. This post is received within a stirrup 231 (FIG. 11) from which extends a bolt portion 232 which passes through the head 228 where it is provided with a nut 233. A sleeve 234 surrounding the stirrup 231 provides a rotatable backup element for the post 230 so that the post may be swiveled on the bolt 232 and clamped in the desired position by nut 233.

The index toothrest 222 is likewise supported on the upper end of a post 235 received within a stirrup 236 (FIG. 10) provided with a bolt portion 237 which passes through a depending arm 238 on the bracket 226 where it is fitted with a nut 239. A sleeve 240 surrounding the stirrup 236 provides a rotatable backup element for the post 235 and enables it to be clamped in any desired angular position by tightening the nut 239.

The index toothrest 222 is supported by a lever 245 pivoted on a pin 246 carried by the upper end of the post 235. The lever 245 is urged clockwise as viewed in FIG. 11 by a compression spring 247 so as to engage against the lower end of a lever 248 pivoted at 249 on a bracket 250 fastened to the post 235. The upper end of the lever 248 bears against the operating plunger of limit switch 4LS mounted on bracket 250 and holds the plunger depressed when the index toothrest 222 is in the position shown in FIG. 11. However, when a tooth 221 on the cutter passes the toothrest it will cam the lever 245 counterclockwise and release the plunger of the limit switch. The manner in which the limit switch 4LS is utilized to control the indexing of the cutter from one tooth 221 to the next will be described in connection with the electrical control circuit shown in the wiring diagram at a later point in this description.

Electric Control Circuits

The machine as herein above described includes five electric motors M1, M3, M4, M5, and M6 which must be operated in properly timed sequence in order to carry out the automatic grinding cycle. For this purpose, relay control circuits have been provided which supply the logic necessary to effect functioning of the motors at the proper times and in the correct sequence. These circuits and the motors controlled thereby are shown in the wiring diagram, FIGS. 12a to 12h, inclusive. As indicated therein, three-phase alternating current is supplied by main lines LL1, LL2 and LL3, and spindle motor M1, truing motor M3, and pickfeed motor M4 are arranged to be connected thereto by contacts of relays 1LM, 1RM, 3MR and 4MR. Relays 1LM and 1RM control left hand and right hand rotation of the spindle motor M1, these relays being interlocked, as indicated by the dotted line, to insure that only one set of contacts can be closed at a time.

The torque motor M5, which drives the workhead is an A.C. torque motor which is capable of operating under conditions of continuous stall and which can provide the torque required to drive the workhead and hold the cutter against the toothrest during grinding. This motor is adapted to be energized from variable transformers VT1, VT2, and VT3 which are in turn energized by transformers T1, T2, and T3. The primary windings of the latter transformers are connected across the main lines LL1, LL2, and LL3 while the secondary windings thereof are connected to the lines 1, 2, and 3 to provide a three-phase supply of the proper potential for energizing the variable transformers and the torque motor M5. The windings of transformers VT2 and VT3 are connected across lines 1 and 2 as is also the winding of transformer VT1 but the connections to the latter transformer are reversed. The transformers are connected to the torque motor through the contacts of relays 1PR, 2PR and 3PR and the connections are such that when relays 1PR and 2PR are energized the torque motor will tend to rotate in a direction to place a cutter tooth on the toothrest while, when relay 3PR is energized, the torque motor will tend to rotate in the opposite direction to effect indexing of the cutter. Each of the variable transformers is provided with a manual adjustment knob on the control panel (not shown) so as to enable the amount of torque applied by motor M5 to be adjusted as desired in each case.

Figure 12A:
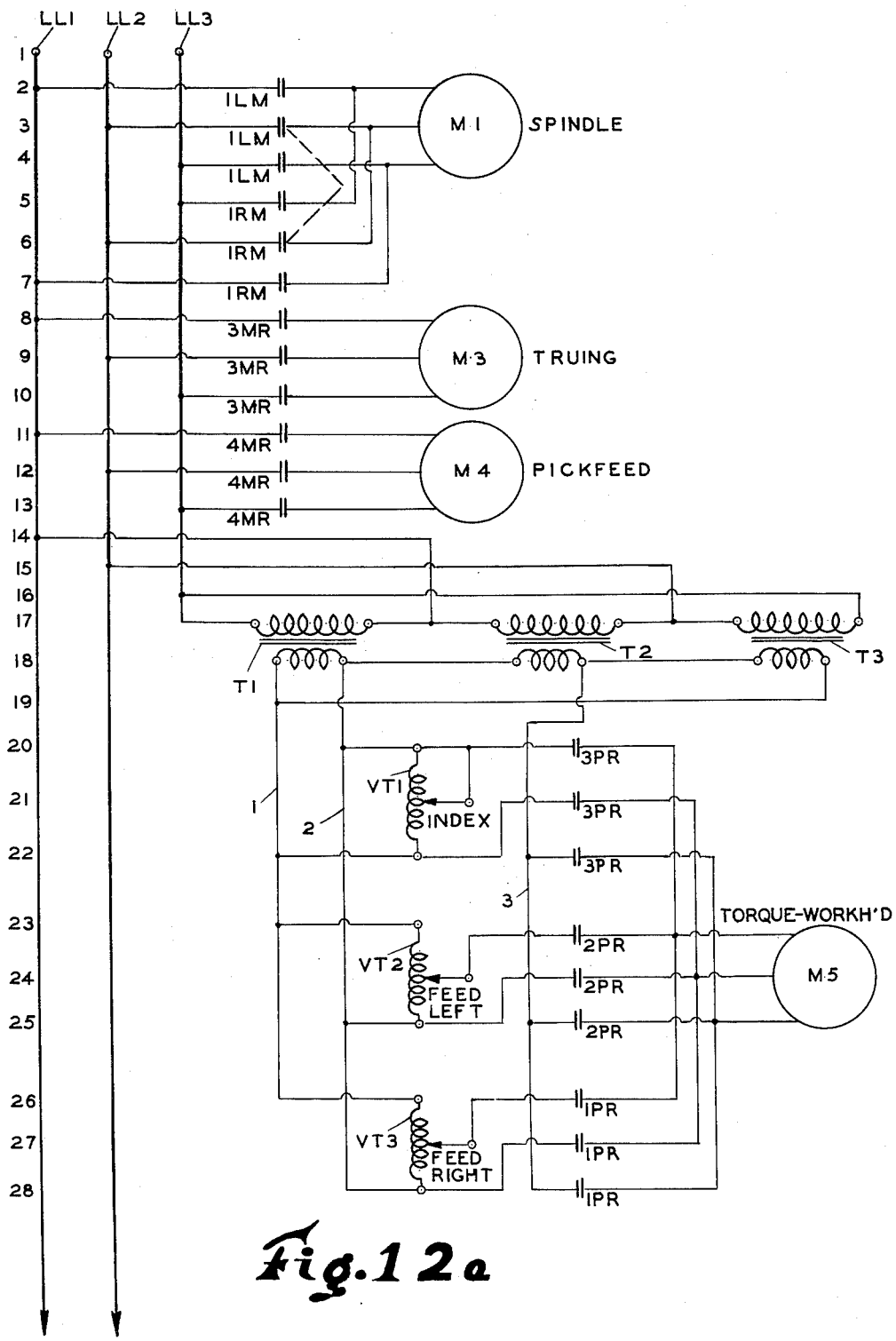
Figure 12B:
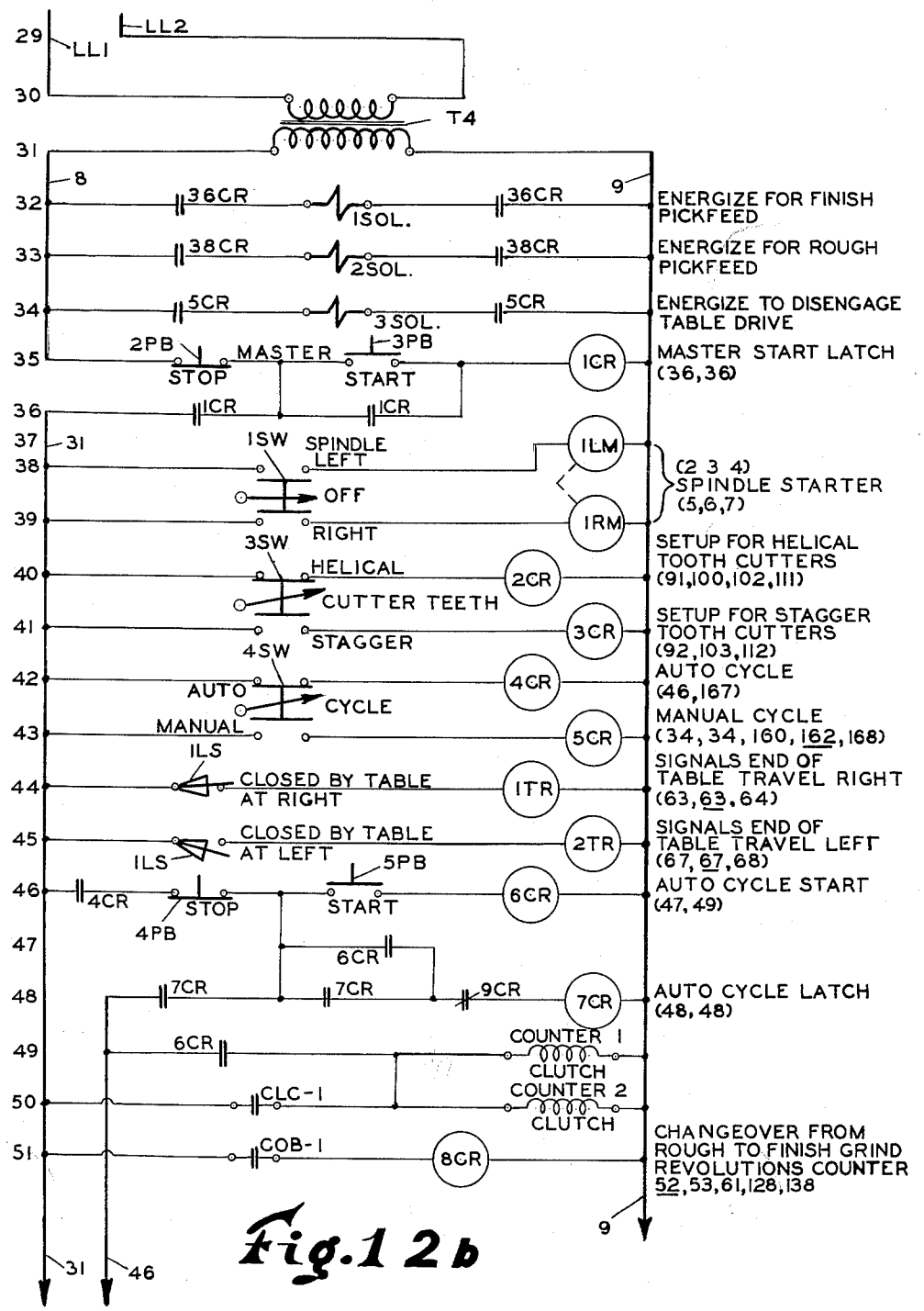
Figure 12C:
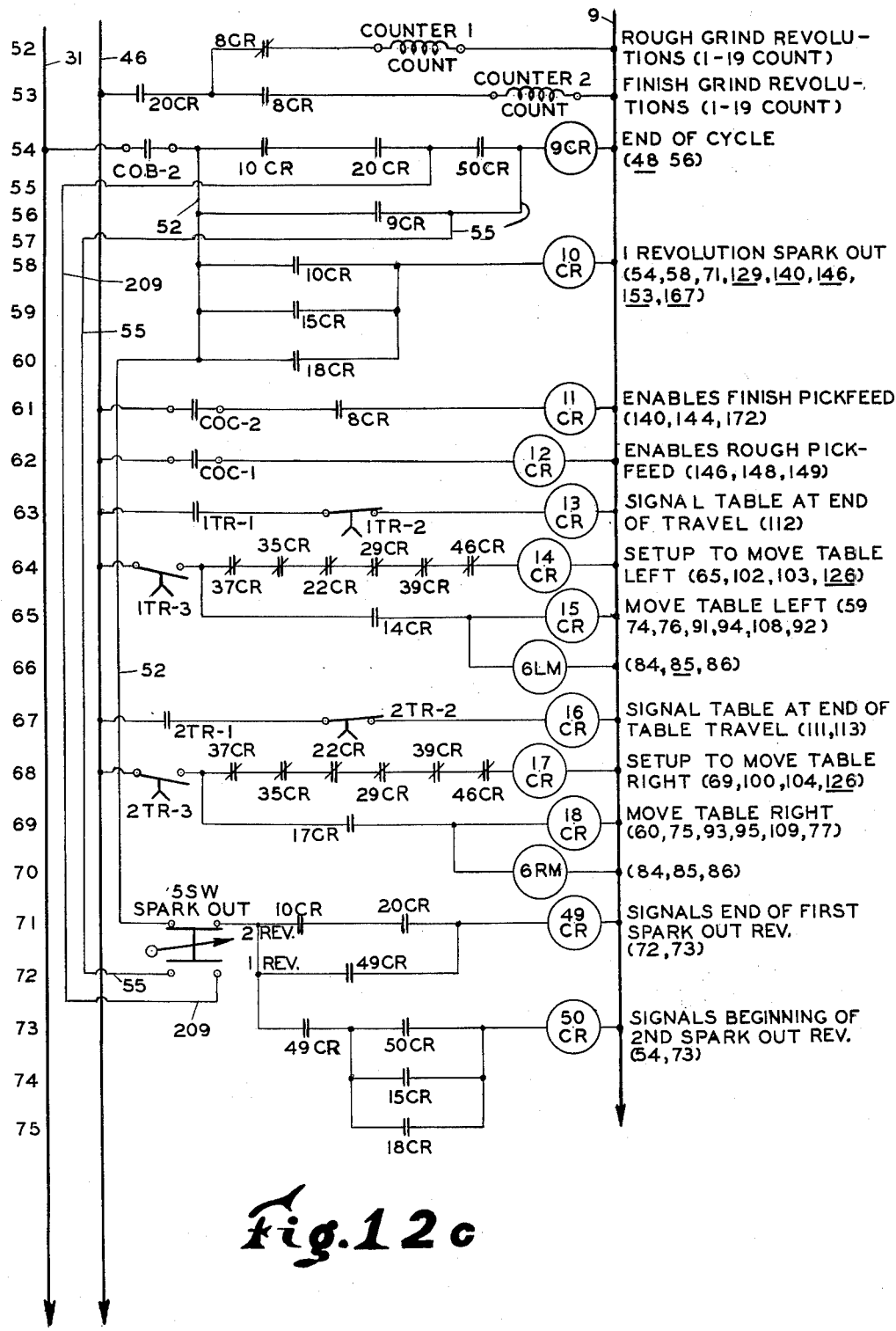
Figure 12D:
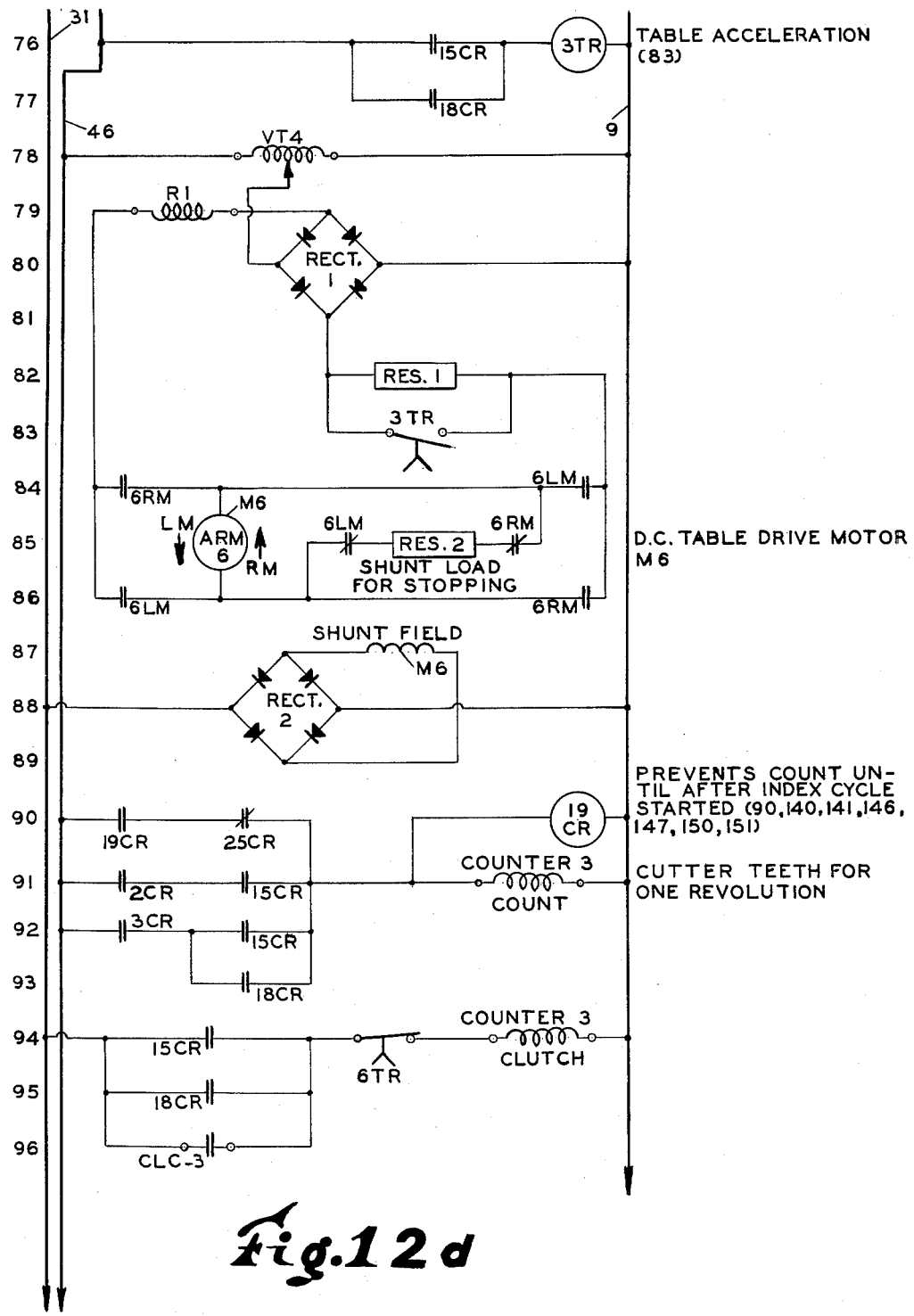
Figure 12E:
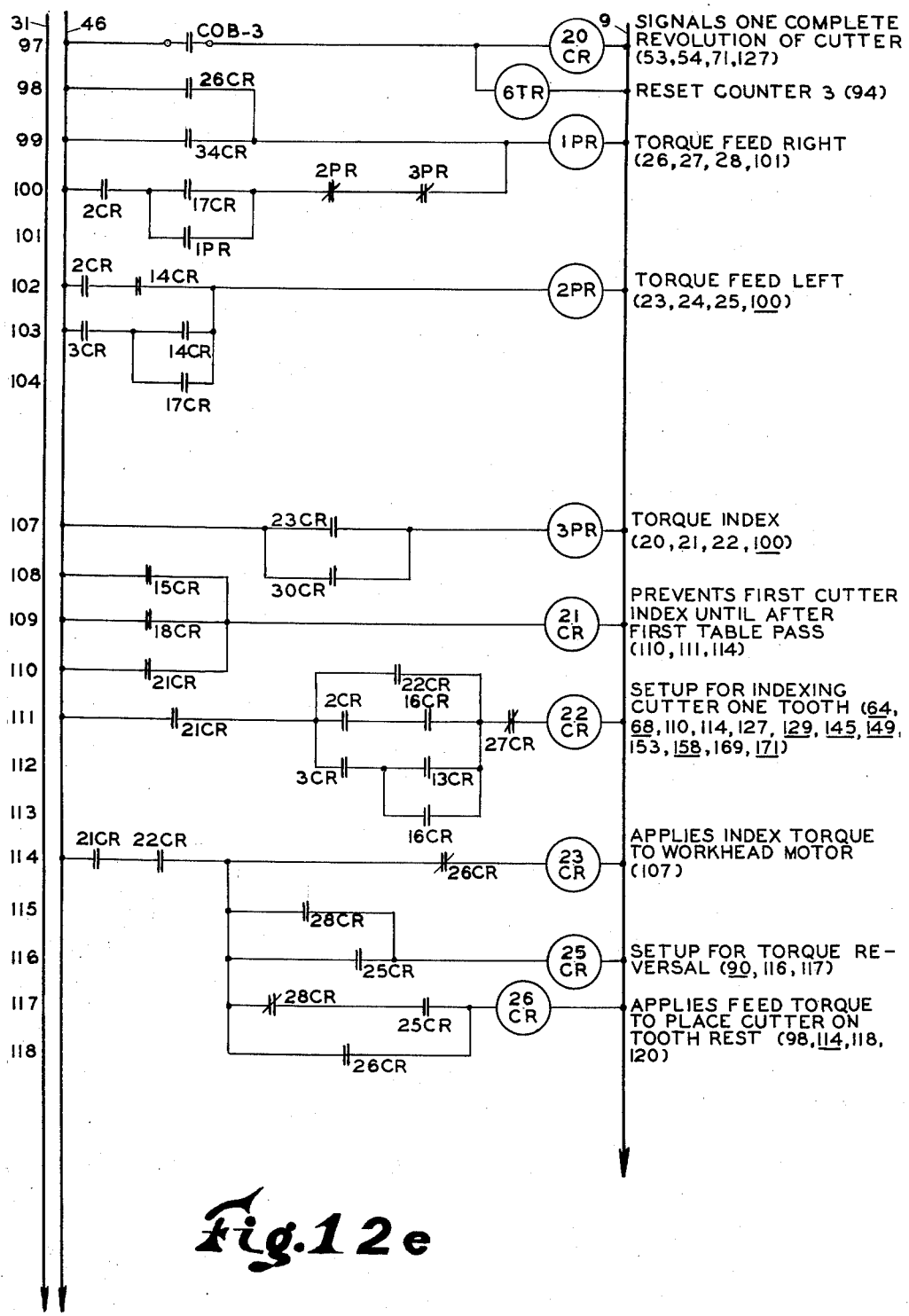
Figure 12F:
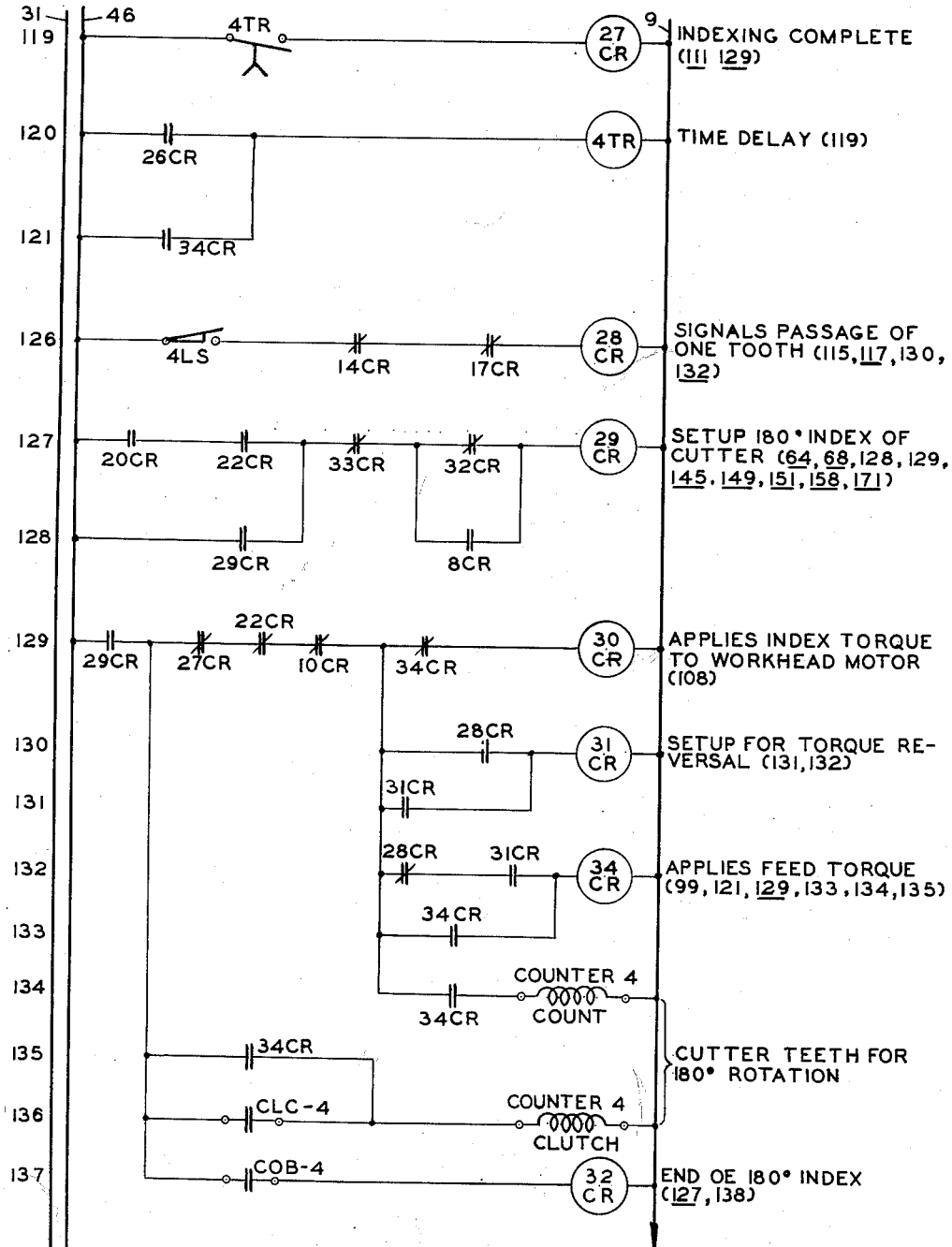
Figure 12G:
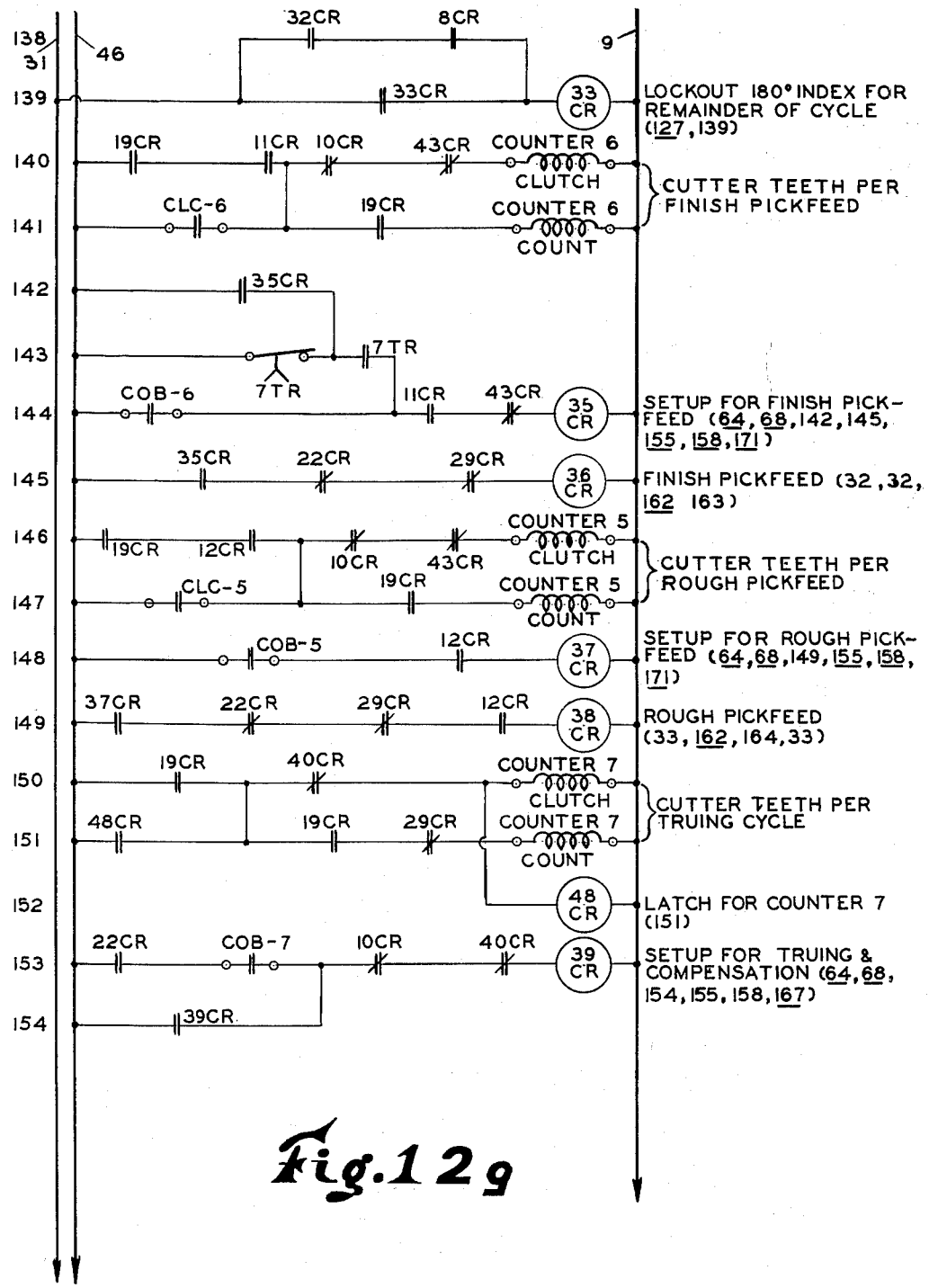
Figure 12H:
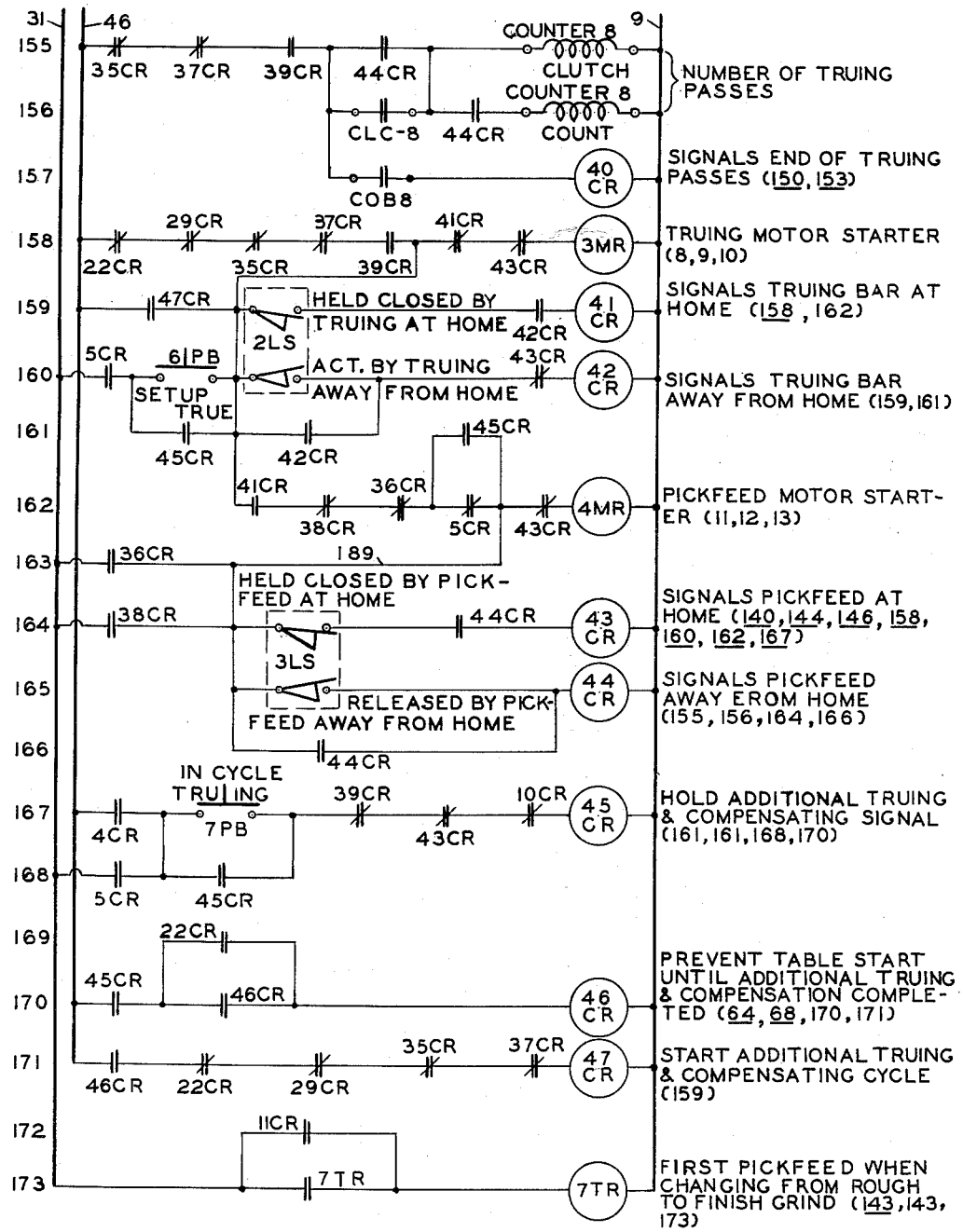

Energizing potential for the control relays and also for the table drive motor M6 (line 85, FIG. 12d) is supplied by transformer T4 (line 30). The primary winding of this transformer is energized from lines LL1 and LL2 while the secondary winding thereof is connected to conductors 8 and 9 as shown in FIG. 12d. Pickfeed solenoids 1SOL and 2SOL are connected between conductors 8 and 9 in series with relay contacts 36CR and 38CR, respectively. Table drive disengaging solenoid 3SOL is likewise connected between conductors 8 and 9 in series with contacts of a relay 5CR. Accordingly, when any one of these three relays is energized, its contacts in lines 32, 33, or 34 will be closed and energize its respective solenoid.

To condition the machine for operation, a master start pushbutton 3PB in line 35 is depressed thereby energizing a control relay 1CR(35). Energization of this relay closes its contacts in line 36 thereby establishing a holding circuit around the pushbutton 3PB and also connecting conductor 8 to a conductor 31 which will remain energized until a master stop pushbutton 2PB(35) is depressed to break the energizing circuit to relay 1CR and conductor 31.

The interlocked relays 1LM(37) and 1RM(39) are adapted to be controlled by a selector switch 1SW. This switch is settable from an "Off" position to a "Left" position in which relay 1LM will be energized, or to a "Right" position in which relay 1RM will be energized. Accordingly, by means of switch 1SW, the grinding wheel spindle may be turned on and caused to rotate either in a left-hand direction or a right-hand direction as desired.

Control relays 2CR(40) and 3CR(41) are utilized to control the setup for helical or stagger tooth cutters and one or the other of these relays is always selected depending upon the setting of a selector switch 3SW. When the switch is set for "Helical," relay 2CR will be energized and when the switch is set for "Stagger," relay 3CR will be energized. The manner in which these relays control the setup for the two different types of cutters will become clear as the description proceeds.

A control relay 4CR(42) and a control relay 5CR(43) control the automatic and manual operation of the machine. These relays are selectively energized under the control of a selector switch 4SW which when set to "Auto" causes relay 4CR to be energized and, when set to "Manual" causes a relay 5CR to be energized. The manner in which these two relays control the functioning of the relay circuits will become clear as the description proceeds.

In the following discussion, the relay control circuits which are utilized to effect the various functions of the machine during an automatic cycle will be described under separate headings in order to afford to clear understanding of the functions being performed.

*Automatic Cycle Start*

It is to be noted at the outset that the electric counters which will hereinafter be described and which are designated herein as counters 1–8, inclusive, may be of the type made by the Eagle Signal Corporation of Moline, Illinois, and sold to the trade under the name "Microflex." The counters each have a clutch coil which must be energized to enable operation of the counter, and a count coil which causes a count to be entered each time it is deenergized. Resetting of the counter takes place when the clutch coil is deenergized. The counters as used herein each have three types of contacts, namely, COB contacts which are normally open but are closed when the counter counts out; COC contacts which are normally closed but open when the counter counts out; and CLC contacts which are normally closed but open when the counter is reset.

An automatic cycle is initiated by depressing a pushbutton 5PB(46). Since at this time switch 4SW is set for an automatic cycle, relay 4CR is energized thereby closing contacts 4CR in line 46. Hence, depression of pushbutton 5PB energizes relay 6CR(46) and closes normally open contacts 6CR in line 47 thereby energizing relay 7CR(48) through the normally closed contacts 9CR(48). This causes both pairs of normally open contacts 7CR in line 48 to be closed and energizes the automatic cycle line 46. At the end of the automatic cycle, i.e., when the finish grind revolutions have been completed and counter 2 counts out, the normally open contacts COB2(54) of counter 2 close and connect relay 9CR to the conductor 31 through contacts 10CR, 20CR, and 50CR which are closed at the end of the sparkout revolution of the cutter. Thereby relay 9CR is energized and its contacts 9CR in line 48 are opened. This drops out relay 7CR and deenergizes the automatic cycle line 46.

It is to be noted that the clutch coils (49 and 50) of counter 1 and counter 2 are both connected to the automatic cycle line 46 through normally open contacts 6CR in line 49. Hence, when the pushbutton 5PB is depressed, both clutch coils will be energized and the contacts CLC1 of counter 1 in line 50 will be closed. This establishes a holding circuit for the clutch coils by connecting them directly to the conductor 31. This is for the purpose of maintaining the clutches energized even though the automatic cycle be interrupted. This prevents a loss of the count in case the automatic cycle line 46 is deenergized, it being remembered that the counters are only reset when the clutch coils are deenergized.

Referring again to the operation of relay 9CR, the contacts COB2 of counter 2 in line 54 will close at the end of the automatic cycle, as above noted, and will remain closed until Master Stop pushbutton 2PB(35) is depressed. Depression of this pushbutton deenergizes line 31 and the clutch coils of counters 1 and 2 thereby resetting the counters and opening contacts COB2 thus permitting relay 9CR to drop out and close its contacts in line 48. The circuit is thereby conditioned for another automatic cycle which may be started by depressing cycle start pushbutton 5PB(46). Thus, the circuit is so arranged that while counters 1 and 2 cannot be reset by a interruption of the automatic cycle, resetting of these counters is enforced prior to the start of an automatic cycle.

*Rough and Finish Grind Revolutions*

The count coils of counters 1 and 2 (52, 53) are connected to the automatic cycle line 46 through the normally open contacts of a relay 20CR and also through the contacts of a relay 8CR. Relay 20CR(97) is connected to the automatic cycle line 46 through the contacts COB3 of counter 3 which counts out at the end of each revolution of the cutter. When the counter counts out, its contacts COB3 close and energize relay 20CR. At the same time, a time delay relay 6TR(98) is energized and, after a predetermined time interval, the normally closed contacts of this relay in line 94 open and deenergize the clutch coil of counter 3. This resets the counter and opens contacts COB3 which deenergizes relay 20CR. Hence, relay 20CR is momentarily energized at the end of each revolution of the cutter.

When contacts 20CR in line 53 are closed, the count coil of counter 1 is energized through the normally closed contacts of relay 8CR(52). When the contacts 20CR thereafter open, the count coil is deenergized and a count is entered into counter 1. After the prescribed number of rough grind revolutions of the cutter have been accomplished, counter 1 times out and closes contacts COB1 in line 51. This energizes relay 8CR and maintains it energized until the master stop pushbutton is depressed at the end of the cycle. Hence, contacts 8CR in line 52 open and contacts 8CR in line 53 close thereby transferring the count to counter 2, which tallies the finish grind revolutions. After the prescribed number of finish grind revolutions of the cutter have been completed, the contacts COB2 in line 54 close.

Table Traverse

Limit switch 1LS (lines 44 and 45) which is mounted on the front of the saddle 11, as shown in FIG. 1, is adapted to be operated by adjustable stops 36 and 36' for limiting the right-hand and left-hand travel of the table, respectively. Limit switch 1LS is essentially a single pole, double throw switch which has two sets of contacts as indicated in lines 44 and 45. When the table reaches the end of its travel to the right, contacts 1LS(44) are closed by stop 36 and contacts 1LS(45) are simultaneously opened. When the table reaches the end of its travel to the left, contacts 1LS(45) are closed by stop 36' and contacts 1LS(44) are simultaneously opened. As further indicated in lines 44 and 45, the contacts of limit switch 1LS control the energization of time delay relays 1TR and 2TR. Thus, when the table reaches the end of its travel to the right, relay 1TR will be energized thereby closing its instantaneous contacts 1TR-1 in line 63. This energizes relay 13CR but only momentarily since the delay contacts 1TR-2(63) will time open and cause it to become deenergized. The delay contacts 1TR-3 (line 64) time closed and energize relay 14CR which closes its contacts in line 65 and energizes relays 15CR and 6LM. Energization of relay 6LM causes its contacts in lines 84 and 86 to close thereby establishing a circuit through the armature ARM6(85) of the table drive motor M6 as follows: automatic cycle line 46, variable transformer VT4, rectifier RECT1, starting resistance RES1, delay contacts 3TR, contacts 6LM(84) ARM6, contacts 6LM(86) reactor R1 and rectifier RECT1 to conductor 9. The shunt field coil of motor M6 is supplied with a constant D.C. current by rectifier RECT2. Energization of relay 15CR causes its contacts in line 76 to close thereby energizing a time delay relay 3TR. Delay contacts 3TR in line 83 thereafter time closed and short out the starting resistance RES1 to bring the motor M6 up to speed. The amount of armature current through the motor can be adjusted as desired by variable transformer VT4 thereby providing an infinitely variable table feed rate.

As the table moves to the left, the cutter is traversed past the grinding wheel and a tooth is ground. When the table reaches the end of its travel to the left, the limit switch 1LS is operated by stop 36' on the table whereby contacts 1LS(44) are opened to deenergize relay 1TR and contacts 1LS(45) are closed to energize relay 2TR. The delay contacts 1TR-3(64) are immediately opened thereby deenergizing relays 15CR and 6LM. This causes contacts 6LM in lines 84 and 86 to open and contacts 6LM in line 85 to close. This deenergizes the table drive motor M6 and the feed of the table to the left is stopped. When the contacts 6LM in line 85 close, they connect a resistor RES2 across the armature ARM6 so as to effect dynamic braking of the motor. At the same time, the contacts 2TR-1(67) close and energize relay 16CR but only momentarily, however, since the relay is deenergized as soon as contacts 2TR-2(67) time open. Also, contacts 2TR-3(68) time closed and energized relay 17CR thereby closing contacts 17CR(69) and energizing relays 18CR and 6RM. Closure of contacts 6RM in lines 84 and 86 energize the armature ARM6 but this time in the opposite direction so as to move the table to the right. Closure of contacts 18CR in line 77 causes relay 3TR to be energized whereupon the delay contacts 3TR(83) will time closed and short out the starting resistor RES1.

Sparkout

Provision is made in the present machine for giving each tooth of the cutter either one or two sparkout passes across the grinding wheel at the conclusion of the finish grind revolutions. For this purpose there is provided a selector switch 5SW(71) which may be set either to a 1REV position or a 2REV position. With the switch set to the 1REV position, the end of cycle relay 9CR will be energized after one revolution of the cutter. In the 2REV position it will be deenergized after two revolutions of the cutter.

It will be recalled that the COB2 contacts in line 54 are closed when counter 2 counts out after the last finish grind revolution of the cutter. With switch 5SW set to the 1REV position, a conductor 209 is connected to a conductor 55 which is connected to the left-hand side of relay 9CR. Hence, when contacts COB2, 10CR and 20CR are closed, relay 9CR will be energized and stop the cycle.

Relay 10CR(58) is adapted to be energized by the first closure of contacts 15CR or 18CR after the contacts COB2 close. In other words, relay 10CR will be energized on the next table traverse following the end of the finish grind revolution and will be held energized by the holding contacts 10CR in line 58. Relay 20CR(97), it will be recalled, is momentarily energized at the end of each revolution of the cutter. Hence, relay 9CR will be energized after one revolution of the cutter and, since no pickfeed of the grinding wheel takes place immediately before or during this final revolution, each cutter tooth will receive one sparkout pass.

When the switch 5SW is set to the 2REV position, conductor 31 is connected through the contacts COB2, conductor 52, switch 5SW and contacts 10CR and 20CR (71) to the left-hand side of a relay 49CR. Hence, when contacts 10CR and 20CR are closed at the end of the first sparkout revolution, relay 49CR will be energized and held energized by its contacts 49CR in line 72. The contacts 49CR in line 73 are also closed and condition relay 50CR for energization upon closure of contacts 15CR(74) or 18CR(75). Hence, relay 50CR will be energized on the first table traverse following the end of the first sparkout revolution. Relay 20CR is deenergized by the time relay 50CR is energized so that although contacts 50CR in line 54 are now closed, relay 9CR will not be energized until the end of the next revolution of the cutter when relay 20CR is again energized to close contacts 20CR in line 54.

Indexing Cutter 1 Tooth

When the selector switch 3SW(40) is set for "Helical," relay 2CR will be energized and the cutter will be indexed one tooth each time the table moves to its left-hand position. However, with the switch 3SW set for "Stagger" the relay 3CR will be energized and the cutter will be indexed 1 tooth at both ends of the table movement. This is because it is possible to provide a flexible or index toothrest on the table for a stagger tooth cutter which moves with the cutter and thereby permits indexing of the cutter at either end of the table movement. This is not possible, however, with a helical type cutter and the mounting of the index toothrest on the wheelhead requires that the cutter always be indexed at the same end of the table movement.

Indexing of the cutter is controlled by a relay 22CR(111) which is adapted to be energized under the control of relays 13CR and 16CR. Initially, however, a relay 21CR must be energized to close its contacts in line 111. The relay 21CR is adapted to be energized during the first pass of the table in either direction after which it will remain energized throughout the remainder of the automatic cycle. Thus, when the table moves to the left, relay 15CR(65) is energized and closes its contacts 15CR in line 108. Similarly, relay 18CR is energized during movement of the table to the right and closes its contacts in line 109. In either case, relay 21CR will be energized and close its holding contacts in line 110 thereby maintaining the relay energized throughout the remainder of the automatic cycle. The purpose of relay 21CR is to prevent energization of relay 22CR until after the first table pass. This prevents indexing of the cutter immediately upon initiation of the automatic cycle and before the first tooth has been ground.

With the switch 3SW set for "Helical," at the end of the first pass of the table to the left, relay 16CR will be energized and close its contacts in line 111 thereby energizing relay 22CR. With the switch 3SW set for "Stagger," at the end of the first pass of the table either to the right or the left, relay 13CR or 16CR will be energized and close its contacts in lines 112 or 113, respectively, to energize relay 22CR. The holding contacts 22CR in line 110 will hold the relay energized until the normally closed contacts 27CR(111) open at the end of the indexing operation.

When relay 22CR is energized, it will close its contacts in line 114 and energize relay 23CR through the normally closed contacts 26CR. Accordingly, contacts 23CR in line 107 will be closed and energize the index torque relay 3PR, which, as previously explained, energizes the torque motor M5 in the reverse direction to lift the cutter tooth off the index tooth rest 222. As the tooth passes the toothrest, it releases limit switch 4LS(126) and energizes relay 28CR through the normally closed contacts of relays 14CR and 17CR. The contacts of relay 28CR in line 115 will thus be closed and energize relay 25CR which closes its own contacts in line 116 in order to hold the relay energized. At the same time, contacts 25CR in line 117 will be closed and, when the tooth has passed beyond the toothrest, relay 28CR will be deenergized and close its contacts in line 117 thereby energizing relay 26CR which will be held energized by its contacts in line 118. Also, the normally closed contacts 26CR in line 114 will be opened thereby dropping out relays 23CR and 3PR(107). At the same time, contacts 26CR in line 98 will be closed and energize the feed torque relay 1PR which applies feed torque to the motor M5. This rotates the cutter in a direction to place the next tooth on the toothrest and hold it there.

The relay 26CR also has a pair of normally open contacts in line 120 which, when closed, energize time delay relay 4TR and cause contacts 4TR in line 119 to timed closed after a suitable time interval. When the contacts 4TR close, relay 27CR will be energized and the normally closed contacts 27CR in line 111 will open and drop out relay 22CR. Hence, contacts 22CR in line 114 open and drop out relays 25CR and 16CR thereby deenergizing relays 4TR and 27CR.

When indexing cycle is complete, as indicated by the deenergization of relay 22CR, the machine is ready for the next pass of the cutter across the grinding wheel. Movement of the table is enabled by the closing of the contacts 22CR in lines 64 and 68 whcih permit energization of either relay 14CR or 17CR depending on the position of the table. If indexing is not called for at the end of the next table stroke, the contacts 22CR in lines 64 and 68 will remain closed and condition the table for movement in the opposite direction.

*Counting of Cutter Teeth*

Each time the cutter is indexed from one tooth to the next, a count is entered on counter 3 which is set to read the number of teeth on the cutter being ground. Hence, when this counter counts out, it indicates that the cutter has completed one revolution.

The clutch coil (94) of counter 3 is energized on the first pass of the table in either direction at which time either relay 15CR or 18CR will be energized thereby closing the contacts 15CR(94) or 18CR(95) to energize the coil. When the coil is energized, the contacts CLC3 of counter 3 are closed and remain closed until the counter counts out after which it is reset and the contacts CLC3 caused to open. The contacts CLC3 serve as holding contacts for the clutch coil and cause it to remain energized for one complete revolution of the cutter.

The count coil (91) is energized, in the case of a helical tooth cutter, each time the table moves to the left when contacts 2CR and 15CR(91) are closed. In the case of a stagger tooth counter, the count coil is energized each time the table moves either right or left, the contacts 3CR(92) and contacts 15CR(92) or contacts 18CR(93) being closed at this time. Each time the count coil is energized a relay 19CR connected in parallel therewith is energized and its contacts in line 90 are closed. The latter contacts together with the normally closed contacts 25CR provide a holding circuit for the count coil and relay 19CR and hold them energized until relay 25CR is energized during indexing of the cutter. This occurs when the cutter tooth moves past the index tooth-rest and causes relay 28CR to be energized. Relay 25 is thereby energized and the count coil is deenergized. When this occurs, a count is entered in counter 3 and it is again ready to be energized on the next pass of the table and to be deenergized during the next indexing operation to enter another count, and so on. When the counter counts out at the end of one complete revolution, the contacts COB3(97) close and energize relays 20CR and 6TR. Accordingly, the contacts 6TR(94) time open and deenergize the clutch coil which rests the counter and deenergizes relay 20CR and 6TR.

*Torque Compensation*

Means is provided in the present machine for individually adjusting the torque to be applied to right-hand and left-hand helical tooth cutters. When a right-hand helical cutter (FIG. 1) is ground, it will be appreciated that greater torque is required to keep the tooth on the toothrest when the table is moving to the left than when it is moving to the right. This is due to the fact that the tooth tends to lift off of the toothrest when moving to the left and tends to move onto the rest when moving to the right. For a left hand cutter the effect is just the opposite.

As previously noted, the torque applied by motor M5 tending to keep the tooth on the toothrest is controlled by the variable transformers VT2 and VT3. Energization of the motor M5 via the transformers VT2 and VT3 is controlled by relays 2PR(102) and 1PR(99) which have contacts in lines 23–28, inclusive, and are adapted to connect the motor to one or the other of the transformers. When the switch 3SW is set for "Helical" and the table is moving to the right, contacts 2CR and 17CR in line 100 will be closed to thereby energize relays 1PR and motor M5 via the transformer VT3. When the table is moving to the left with the switch 3SW set for "Helical," the contacts 2CR and 14CR in line 102 will be closed and energize relay 2PR and motor M5 via transformer VT2. Hence, when a right-hand helical tooth cutter is to be ground, the transformer VT2 should be set for a higher torque than transformer VT3. Conversely, when a left hand cutter is to be ground, the transformer VT3 should be set for a higher torque than transformer VT2.

Holding contacts 1PR in line 101 are shunted across the contacts 17CR(100) so as to maintain relay 1PR energized until the normally closed contacts 2PR or 3PR(100) are opened upon energization of their associated relays. Relay 3PR is energized during indexing to apply reverse torque to the cutter and relay 2PR is energized when the table moves in the opposite direction, i.e., to the left.

When switch 3SW is set for "Stagger," contacts 3CR in line 103 will be closed and relay 2PR will be energized when the table moves to the left at which time contacts 14CR(103) will be closed, and also when the table moves to the right at which time contacts 17CR(104) will be closed. Thus, the torque applied to the cutter will be the same in both cases and will be determined by the setting of the transformer VT2. This is desirable since alternate teeth of a stagger tooth cutter are inclined in opposite directions and the reaction of the toothrest against the cutter tooth remains the same in both directions of table travel when the cutter is indexed on each stroke of the table.

180° Indexing

To insure perfect roundness of the cutter it is desirable after each complete rotation thereof to index the cutter 180° before starting the next grind. This compensates for wear of the grinding wheel which would otherwise tend to grind the last tooth a little larger than the first tooth. The 180° indexing is effected under the control of counter 4 which is set to one half the number of cutter teeth before the automatic cycle is started. As each tooth is indexed during the 180° indexing operation, the counter is advanced one stop and after 180° or one half of the teeth it counts out and stops further indexing of the cutter.

It will be recalled that relay 20CR is momentarily energized at the end of each revolution of the cutter. Hence, a signal from this relay can be used to initiate the 180° indexing operation. Accordingly, a relay 29CR(127) is adapted to be energized when the contacts 20CR in line 127 are closed, the contacts 22CR in this line also being closed at this time. The relay 29CR is held energized after the relay 20CR drops out by holding contacts 29CR in line 128. Energization of relay 29CR opens contacts 29CR in lines 64 and 68 so as to prevent movement of the table when contacts 22CR (64 and 68) close at the end of the index cycle in which counter 3 times out. Energization of relay 29CR also closes contacts 29CR in line 129 thereby energizing relay 30CR when contacts 22CR and 27CR(129) close at the end of the index cycle. Contacts 30CR in line 108 are then closed to energize relay 3PR and apply index torque to the cutter. As the cutter rotates, the next tooth moves against the index toothrest and causes limit switch 4LS to close and energize relay 28CR. Thereupon, relay 31CR(130) will be energized and held in by contacts 31CR in line 131. When the tooth releases the index toothrest, relay 28CR will drop out and a relay 34CR will be energized by closure of contacts 28CR in line 132. This relay thereupon closes its contacts in line 99 and energizes relay 1PR to apply feed torque to the cutter thereby urging the tooth down against the toothrest. The closing of contacts 34CR in lines 134 and 135 energize the clutch coil and count coil of counter 4 and the closing of contacts 34CR in line 121 energize relay 4TR. After a short delay, the contacts 4TR in line 119 time closed and energize relay 27CR which causes contacts 27CR in line 129 to open and drop out relays 30CR, 31CR, 34CR and the count coil of counter 4. A count is thereby entered in the counter and the contacts 34CR in line 121 open and de-energize relay 4TR which drops out relay 27CR. The contacts of this relay in line 129 thereupon close so as to again energize relay 30CR and cause indexing of the next tooth. This process is repeated until counter 4 counts out at which time the contacts COB4 in line 137 are closed and relay 32CR is energized to signal the end of 180° indexing by opening its contacts in line 127 which drops out relay 29CR and causes its contacts in line 129 to open. The clutch coil of counter 4 is thereby deenergized whereupon the counter is reset and contacts CLC4(136) and COB4(137) are opened. It is to be noted that the contacts 34CR in line 135 serve merely to energize the clutch coil after which the coil is held energized by the contacts CLC4(136) which remain closed during the counting and counted out state of the counter.

Since there is normally very little wheel wear during the finish grinding operation, it is desirable to eliminate the 180° indexing feature during this part of the cycle. Since relay 20CR(97) is momentarily energized at the end of the last rough grind revolution, and since relay 8CR(51) is energized when relay 20CR is thereafter deenergized due to counting out of counter 1, contacts 8CR in line 138 will be closed at the end of the 180° indexing following the end of the rough grinding revolution and therefor a lock out relay 33CR(139) will be energized when contacts 32CR in line 138 close. The contacts 33CR in line 127 will therefor open and prevent energization of relay 29CR throughout the rest of the automatic cycle. Relay 33CR has holding contacts in line 139 which will maintain this relay energized until the master stop pushbutton 2PB is depressed.

Rough and Finish Pickfeed

At the end of each rough and finish grind revolution it is, of course, necessary to pickfeed the saddle by an amount equal to the amount of the stock which is to be removed on each pass of the grinding wheel over the teeth. In fact, it may be found desirable, depending on the nature of the wheel and the work, to pick a slightly greater amount than this in order to compensate for the wheel wear occurring during each revolution of the cutter. For this purpose, counters 5 and 6 are provided which are normally set to a number corresponding to the number of teeth on the cutter before the automatic cycle is started. Counter 5 designates the number of cutter teeth per rough pickfeed while counter 6 designates the number of cutter teeth per finish pickfeed. During the rough grinding operation, relay 12CR(62) is held energized through the contacts COC1(62) which are closed during counting of counter 1. When the counter counts out, the contacts COC1 open and drop out relay 12CR. Contacts 12CR in line 146 are therefore held closed during rough grinding and contacts 19CR(146) are closed on the first traverse of the table to thereby energize the clutch coil of counter 5 through the normally closed contacts 10CR and 43CR. The contacts CLC5(147) of counter 5, which are closed during the counting and counted out state of the counter, serve as holding contacts for the clutch coil. Each time a cutter tooth is counted by counter 3, relay 19CR is deenergized and opens its contacts in lines 146 and 147. This deenergizes the count coil of counter 5 and enters a count in the counter. When the counter counts out, contacts COB5 in line 148 close and energize relay 37CR through the closed contacts 12CR(148). Thereupon, contacts 37CR in line 149 close and energize relay 38CR as soon as contacts 22CR(149) close at the end of the index cycle. The table will be prevented from moving due to the opening of contacts 37CR in lines 64 and 68.

Contacts 38CR in line 33 now close and energize solenoid 2SOL which conditions the pickfeed unit for a rough pickfeed of the saddle. At the same time, contacts 38CR in line 164 close and energize the pickfeed motor relay 4MR through a conductor 189 and the normally closely contacts 43CR (162). The pickfeed motor M4 is energized by the closing of contacts 4MR in lines 11—13 and drives the pickfeed eccentric 68. The cam 111 releases limit switch 3LS and the contacts of this switch in line 165 close. This energizes relay 44CR which closes its contacts in lines 164 and 166. The latter contacts serve to hold the relay energized after the limit switch contacts in line 165 open while the former contacts condition relay 43CR for pickup when the cam 111 returns home and again closes the limit switch contacts in line 164. When relay 43CR is energized, it contacts in line 162 open and deenergize relay 4MR thereby stopping the pickfeed motor. At the same time, contacts 43CR in line 146 open and deenergize the clutch coil for counter 5 which resets the counter.

If a second rough grind revolution is called for by counter 1, relay 12CR will remain energized and on the next traverse of the table when relay 19CR is energized, the procedure outlined above will be repeated. When counter 1 counts out, contacts COC1(62) open and deenergize relay 12CR. At the same time, contacts COB1(51) close and energize relay 8CR. As previously noted, this switches the count from counter 1 to counter 2 and also closes contacts 8CR in line 61 which energizes relay 11CR through the contacts COC2(61) which are closed during timing of chamber 2. Since the time at which relay 12CR is deenergized following the operation of limit switch 4LS(126) is controlled primarily by the time required for contacts 6TR(94) to time open after the relay 6TR(97) is energized, and the time at which relay 22CR(111) is deenergized following the operation of limit switch 4LS is controlled primarily by the time required for contacts 4TR(119) to time closed after the relay 4TR is energized, and since the time delay of contacts 4TR(119) is greater than that of contacts 6TR(94), therefore contacts 12CR in line 149 will open before the contact 22CR(149) close so that relay 38CR will not be energized to initiate rough pickfeed at the end of the last rough grind revolution. Instead, means is provided to initiate a finish pickfeed at this time, i.e., prior to the beginning of the first finish grind revolution.

Relay 11CR has a pair of normally open contacts in line 172 which control the energization of a time delay relay 7TR. This relay has instantaneous contacts in lines 173 and 143 and time delay contacts in line 143. Hence, when this relay is energized by relay 11CR, it will be held energized by its holding contacts in line 173 and will energize a relay 35CR(144) through its contacts in line 143. Relay 35CR has normally closed contacts in lines 64 and 68 to prevent movement of the table whenever it is energized. Since relay 11CR is energized at the same time that relay 12CR is deenergized, relay 35CR will be energized at the same time that relay 37CR(148) is deenergized so as to prevent energization of relays 14CR(64) and 17CR(68) when relay 22CR is subsequently deenergized.

Energization of relay 35CR causes its contacts in line 145 to close and thereby conditions the finish pickfeed relay 36CR for energization when relay 22CR is deenergized. When relay 36CR is energized, it closes its contacts in line 32 and energizes solenoid 1SOL which conditions the pickfeed unit for a finish pickfeed of the saddle. It also closes contacts 36CR in line 163 thereby energizing relay 4MR which starts the pickfeed motor M4. At the end of one revolution of the pickfeed cam 111, relay 43CR is energized and opens its contacts in lines 144 and 162 so as to drop out relays 35CR, 36CR and 4MR thereby terminating the finish pickfeed cycle.

When relay 35CR is deenergized, its contacts in line 142 open and, since the time delay contacts 7TR in line 143 are now open, the next finish pickfeed cycle cannot be started until the contacts COB6(144) of counter 6 are closed. The contacts 35CR in lines 64 and 68 also close when relay 35CR is deenergized and permit movement of the table. In counter 6, as in counter 5, each time the cutter is indexed one tooth, relay 19CR is deenergized and a count is entered in the counter. At the end of the first finish grind revolution, counter 6 times out and the contacts COB6(144) close and energize relay 35CR. This closes contacts 35CR in line 145 and sets up relay 36CR for energization when contacts 22CR in line 145 close. Relay 36CR, when energized, initiates a finish pickfeed cycle at th eend of which counter 6 is reset so as to be ready to count the next series of cutter teeth. At the end of the last finish grind revolution, contacts COB6(144) will close and energize relay 35CR as before. However, counter 2 will count out at the same time as counter 6 and cause contacts COC2(61) to open and deenergize relay 11CR. Hence, relay 35CR will be deenergized before the contacts 22CR in line 145 close so that relay 36CR will not be energized and no pickfeed will occur at the conclusion of the last finish grind revolution.

In the foregoing discussion it was assumed that the cutter teeth per rough and finish pickfeed corresponded to the number of teeth on the cutter. It is possible, however, to select a number of teeth which is either greater or less than the number of cutter teeth. In this case, a pickfeed will occur after the number of teeth selected have been indexed and, at the conclusion of the rough grind revolutions, a finish pickfeed will occur upon energization of time delay relay 7TR before the finish grind revolutions commence. In this case also there will be no pickfeed at the conclusion of the finish grind revolutions before the sparkout revolutions begin.

It will be noted that 180° indexing and pickfeed can take place simultaneously, there being nothing inconsistent or contradictory about pickfeeding the saddle the desired amount while indexing the cutter 180°.

*Truing*

Provision is made in the present embodiment of the invention for truing the grinding wheel periodically during the cutter grinding operation. This is done automatically under the control of counter 7(150) which is set to the number of teeth per truing operation. When relay 19CR(90) is energized during the first traverse of the table, its contacts in line 150 are closed thereby energizing the clutch and count coils of counter 7. A relay 48CR(152) is also energized and closes its contacts in line 151 so as to hold the clutch energized. When relay 19CR is deenergized during the first index cycle, the count coil is deenergized and a count is entered in counter 7. This is repeated for each index of the cutter with the exception that no count is entered during 180° indexing due to the opening of contacts 29CR in line 151 during this operation. When counter 7 counts out, the contacts COB7(153) are closed as are also the contacts 22CR(153) since counting always occurs during an index cycle. Consequently, relay 39CR will be energized and held in by its contacts 39CR in line 154. Hence, contacts 39CR in line 158 are closed and cause relay 3MR to be energized when the contacts 22CR(158) close at the end of the index cycle. Relay 39CR also has a pair of normally closed contacts in lines 64 and 68 which prevent movement of the table during a truing cycle.

When relay 3MR is energized, it closes its contacts in lines 8—10 and energizes the truing motor M3. When the motor starts to run, limit switch contacts 2LS(160) are released by the dog 212 and permitted to close thereby energizing relay 42CR which is held energized by its contacts in line 161. When relay 42CR is energized, its contacts in line 159 are closed so that relay 41CR will be energized at the end of the cycle when the dog 212 again actuates the limit switch. When relay 41CR is energized, its contacts in line 158 open thereby deenergizing relay 3MR which stops the motor 3M. At the same time, the contacts 41CR in line 162 are closed so as to energize the relay 4MR. The contacts 4MR in lines 11—13 are thereby closed so as to start the pickfeed motor M4 and initiate a truing pickfeed operation which advances the saddle by an amount corresponding to the amount picked by the truing unit at the end of each truing cycle.

As the pickfeed cam 111 moves out of home position, it releases limit switch 3LS and permits contacts 3LS in line 165 to close and energize relay 44CR. Contacts 44CR in line 166 hold the relay energized and contacts 44CR in line 164 condition the relay 43CR for energization when the limit switch contacts 3LS in line 164 are closed at the end of the pickfeed cycle. When relay 43CR is energized, contacts 43CR in line 162 open and drop out relay 4MR thereby stopping the pickfeed motor M4. At the same time, contacts 43CR in line 160 open and drop out relay 42CR which in turn drops out relay 41CR. This causes contacts 41CR in line 162 to open thereby deenergizing relays 43CR and 44CR. Since contacts 41CR and 43CR in line 158 are now closed, the relay 3MR is again energized and the truing and pickfeed compensation cycle is repeated.

The number of truing passes desired for a truing operation are set up on counter 8 which receives a count at the end of each truing and pickfeed compensation cycle. Thus, when relay 44CR is energized during the first pickfeed cycle, the clutch coil and count coil of counter 8 are energized through the contacts 44CR in lines 155 and 156. At the same time, the contacts CLC8(156) of the counter are closed around the contacts 44CR to provide a holding circuit for the clutch coil. Each time the relay 44CR is deenergized at the end of a pickfeed cycle, the count coil will also be deenergized and a count will be entered in counter 8. On the last truing pass, the opening of contacts 44CR in line 156 will cause the counter to count out and close its contacts COB8 in line 157. Relay 40CR will thereupon be energized and open its normally closed contacts in lines 150 and 153 so as to reset counter 7 and drop out relay 39CR. The contacts 39CR in lines 155 and 158 will then open to reset counter 8 and prevent reenergization of the motor starter relays 3MR and 4MR. This concludes the truing cycle.

Manual truing is a jogging type control and can only be effected when selector switch 4SW is set at "Manual." This energizes relay 5CR so that when pushbutton 6PB(169) is depressed, motor control relay 3MR will be energized. The motor can be stopped at any point in its cycle by releasing pushbutton 6PB. Moreover, the motor will stop at the end of one complete cycle even though the pushbutton be held depressed since the normally closed contacts 41CR in line 158 will open and deenergize relay 3MR.

In Cycle Truing

When pushbutton 7PB(167) is depressed in the course of an automatic grinding cycle, the cycle will be interrupted and grinding wheel will be trued once after which the automatic cycle will pickup where it left off. Since contacts 4CR in line 167 are closed during an automatic grinding cycle, depression of pushbutton 7PB will energize relay 45CR which will be held energized on release of the button by its holding contacts 45CR in line 168. This will cause contacts 45CR in line 170 to close. The next time the relay 22CR is energized at the end of a table stroke, relay 46CR will be energized and held in by contacts 46CR(170). This will close contacts 46CR in line 171, and, when relay 22CR is deenergized at the end of the index cycle, relay 47CR will be energized. It is to be noted that table movement will be prevented upon deenergization of relay 22CR due to the presence of contacts 46CR in lines 46 or 68 which are held open until the end of the truing cycle.

When relay 47CR is energized, its contacts in line 159 are closed thereby energizing motor control relay 3MR. A truing cycle followed by a pickfeed compensation cycle will follow as described above in connection with a regular truing operation. When relay 43CR is energized at the end of the pickfeed cycle, its normally closed contacts in line 167 will open and deenergize relay 45CR. This will drop out relay 46CR and permit the appropriate table drive relay 6LM or 6RM to be energized and start movement of the table so as to continue the automatic grinding cycle.

Operation

An example of the type of work performed by the machine will now be given, it being understood that this represents but one of a number of possible different setups capable of being applied to the apparatus heretofore described.

Assume that the cutter to be sharpened is a helical tooth type of cutter and that the operator estimates that, due to the condition of the cutter, at least .007 inch will have to be removed from each tooth in order to sharpen it properly. He therefore sets switch 3SW for "Helical," the "Rough" pickfeed dial 86 (FIG. 3) for .002 inch, and counter 1 for three revolutions of the cutter. He may also determine that two finish passes of .0005 inch each per tooth will be required for the finish grind. Hence, he sets the "Finish" pickfeed dial 85 for .0005 inch and counter 2 for two revolutions of the cutter. Assume also that he wishes to conclude the operation with two spark-out revolutions of the cutter after the finish grind. He therefore sets switch 5SW for "2REV." He next sets counter 3 to the number of teeth on the cutter, e.g. "12," and counter 4 to one half the number of teeth, i.e. "6." From past experience with the particular wheel used and the type of cutter involved, the operator determines that it will not be necessary to pickfeed the saddle to compensate for wheel wear. Hence, he sets counters 5 and 6 both to "12" so that .002 inch rough pickfeed will occur after the first and second rough grind revolution, and .0005 inch finish pickfeed will occur after the third rough grind revolution and after the first finish grind revolution. If he wishes to true .001 inch off the wheel after each two revolutions of the cutter, he will set counter 7 to "24" and counter 8 to "1." The pickfeed mechanism of the truing unit is preferably designed for a .001 inch advance after each revolution of the truing bar and the stop 82 (FIG. 3) is therefore set for .001 inch pickfeed of the saddle to compensate for the amount trued off by the diamond.

To complete the setup of the machine, a cup-type grinding wheel is mounted on the spindle and the cutter to be ground is mounted on a work arbor and placed between centers on the table with the driver pin 22 connecting the workhead and arbor. The fixed toothrest 220 (FIG. 10) carried by the wheelhead is adjusted to the correct height and positioned so that the high point of the toothrest will provide support to the tooth being ground at a point directly opposite the cutting face of the wheel. The index toothrest may, in this case, also be mounted on the wheelhead since the cutter, being helical, is indexed each time at the same end of the cutter. The index toothrest is adjusted so that it lies a little below the tooth when the latter is supported on the fixed toothrest. Hence, as the end of the cutter tooth moves off of the fixed toothrest it will be supported on the index toothrest.

The variable transformers 1, 2 and 3 are adjusted by hand knobs on the control panel (not shown) so as to provide the proper torque for indexing the cutter and for maintaining uniform pressure of the cutter teeth against the toothrest in both directions of travel of the table, i.e., table feed left and table feed right. The variable transformer 4 (line 78) is adjusted to provide the desired feed rate of the table during grinding.

The setup of the machine is then completed by depressing the master start push button 3PB which energizes relay 1CR and line 31. The direction of grinding wheel rotation is then selected by switch 1SW which should always be such as to tend to hold the cutter on the tooth rest. Turning the selector switch 1SW to "Left" for example, will energize motor relay 1LM which is interlocked with motor relay 1RM. Accordingly, the contacts 1LM in lines 2-4 will be closed and cause the spindle motor M1 to run in such a direction as to cause the grinding wheel to rotate counterclockwise as viewed from the front of the machine.

Selector switch 4SW is then turned to "Manual" thereby energizing relay 5CR. This energizes solenoid 3SOL and disengages the table drive so that the cutter may be run over the toothrest 220 by use of the table hand wheel 35 (FIG. 1) so as to check the set-up. The table dogs should be set to operate the table cycle limit switch 1LS at each end of the table travel before the cutter tooth leaves the fixed toothrest or the index toothrest.

The wheel truing attachment is next adjusted by moving the diamond inward until it just touches the highest point on the grinding wheel. This may be effected by turning the hand wheel 139 (FIG. 8) with the plunger 203 (FIG. 9) pulled out. The grinding wheel may now be trued by depressing push button 6PB (line 160) which starts the truing motor 3M and causes reciprocation of the truing bar. A second truing operation may be effected by releasing the push button and again depressing it to give the truing mechanism a second cycle of operation.

The saddle 11 is now adjusted to cause .002 inch to be ground from the cutter teeth on the first rough grind revolution and the table is moved to its starting position, i.e., all the way to the left as viewed in FIG. 1 so that the right hand dog 36' is on limit switch 1LS.

The automatic cycle is now ready to begin and the operator sets switch 4SW(42) to "Auto" and depresses pushbutton 5PB(46). The table feeds right and grinds the first tooth, then reverses and feeds left back to the starting position. The cutter then indexes after which the table again feeds right to grind the second tooth, and so on until all twelve teeth have been ground. At this point in the cycle, counters 3 and 5 count out and cause 180° indexing of the cutter and a .002 inch pickfeed of the saddle 11. The rough grind operation then continues until another .002 inch have been ground off each tooth after which counters 3 and 5 again count out with the same result as before. At this time, counter 7 also counts out and, since counter 8 is set for "1," a single cycle of the truing mechanism will be effected to remove .001 inch from the grinding wheel and pickfeed the saddle by a like amount. The third rough grind cycle will now take place and, after the last tooth has been ground, counter 1 will count out thereby causing the count to be transferred to counter 2. Counters 3 and 5 will also count out and cause 180° indexing and, since relay 11CR is now energized, a finish pickfeed of the saddle will occur thereby advancing the cutter .0005 inch toward the grinding wheel. The first finish pickfeed revolution will now be effected at the end of which counters 3, 6 and 7 count out so that another finish pickfeed movement of the saddle is effected along with truing of the grinding wheel. The last finish grind revolution is then effected and pickfeeding is inhibited at the end of this revolution so that the first spark out revolution will be started without any feed of the saddle 11. At the conclusion of the second spark out revolution, the end of cycle relay 9CR will be energized and terminate the automatic cycle. The cutter may now be removed from the machine another one inserted preparatory to the start of another automatic grinding cycle. However, the master stop pushbutton 2PB must be depressed to reset counters 1 and 2 before the next cycle can be started. This is due to the fact that relay 9CR remains energized and must be de-energized before another cycle can be initiated.

What is claimed is:

1. In an automatic cutter grinder having a bed, a grinding tool mounted on said bed, a table mounted on said bed for movement relative to the grinding tool, and means including a rotatable workhead for supporting a cutter on said table ofr rotation about its central axis, the combination of intermittently operable means for indexing the workhead to bring successive cutter teeth into grinding position, means for providing a signal at the end of each complete revolution of the cutter, a first counter adapted to receive the revolution signals and to provide another signal at the end of a predetermined number of revolutions of the cutter, a second counter, and means rendered effective by said other signal to transfer the delivery of the revolution signals from the first counter to the second counter.

2. The automatic cutter grinder of claim 1 wherein said signal providing means includes a third counter which is preset to the number of teeth on the cutter and controlled by said indexing means to count the teeth on the cutter.

3. In an automatic cutter grinder having a bed, a grinding tool mounted on said bed, a table mounted on said bed for movement relative to the grinding tool, and means including a rotatable workhead for supporting a cutter on said table for rotation about its central axis, the combination of means for pickfeeding the table to advance the workhead toward the tool, intermittently operable means for indexing the workhead to bring successive cutter teeth into grinding position, means for providing a signal at the end of a predetermined number of indexes of the workhead, and means controlled by said signal for initiating operation of said pickfeed means.

4. The automatic cutter grinder of claim 3 wherein said signal providing means includes a counter which is preset to the predetermined number of indexes and controlled by said indexing means to count the number of indexes of the workhead.

5. In an automatic cutter grinder having a bed, a grinding tool mounted on said bed, a table mounted on said bed for movement relative to the grinding tool, and means including a rotatable workhead for supporting a cutter on said table for rotation about its central axis, the combination of means, including a pair of independently operable devices, for effecting rough and finish pickfeed movements of the table toward said tool, means for counting rough and finish grinding revolutions of the cutter, and means controlled by said counting means for selecting one or the other of said devices for operation.

6. In an automatic cutter grinder having a bed, a grinding tool mounted on said bed, a table mounted on said bed for movement relative to the grinding tool, and means including a rotatable workhead for supporting a cutter on said table for rotation about its central axis, the combination of selectively operable means for effecting either rough or finish pickfeed movement of the table toward said tool, intermittently operable means for indexing the workhead to bring successive cutter teeth into grinding position, normally effective means for causing said selectively operable means to effect a rough pickfeed movement of the table after each revolution of the cutter, means to produce a signal at the end of a predetermined number of revolutions of the cutter, and means controlled by said signal for disabling said normally effective means and causing said selectively operable means to effect a finish pickfeed movement of the table toward the tool.

7. In an automatic cutter grinder having a bed, a grinding tool mounted on said bed, a table mounted on said bed for movement relative to the grinding tool, and means including a rotatable workhead for supporting a cutter on said table for rotation about its central axis, the combination of selectively operable means for effecting either rough or finish pickfeed movement of the table toward the tool, intermittently operable means for indexing the workhead to bring successive cutter teeth into grinding position, means to produce a signal at the end of each revolution of the cutter, normally effective means for causing said selectively operable means to effect a rough pickfeed movement of the table after each revolution of the cutter, a counter adapted to receive the revolution signals and produce another signal at the end of a predetermined number of revolutions of the cutter, and means controlled by said other signal for disabling said normally effective means and causing said selectively operable means to effect a finish pickfeed movement of the table toward the tool.

8. In an automatic cutter grinder having a bed, a grinding tool mounted on said bed, a table mounted on said bed for movement relative to the grinding tool, and means including a rotatable wheelhead for supporting a cutter on said table for rotation about its central axis, the combination of means for effecting a pickfeed movement of the table toward the tool, intermittently operable means for indexing the workhead to bring successive cutter teeth into grinding position, normally effective means for causing said pickfeed means to advance the table toward the tool at the end of each revolution of the cutter, means to produce a signal at the end of a predetermined number of revolutions of the cutter, and means controlled by said signal for disabling said normally effective means and preventing pickfeed movement of the table at the end of said predetermined number of revolutions of the cutter.

9. The automatic cutter grinder of claim 8 including an automatic cycle control circuit, and means rendered effected by said signal to disable said circuit at the end of a predetermined number of spark out revolutions of the cutter following the occurrence of said signal.

10. In an automatic cutter grinder having a bed, a grinding tool mounted on said bed, a table mounted on said bed for movement relative to said cutting tool, and means including a rotatable workhead for supporting a cutter on said table for rotation about its central axis, the combination of a reversible torque motor drivingly connected to said workhead for urging rotation thereof in a forward or a reverse direction, a flexible toothrest adapted to engage a tooth on said cutter and prevent forward rotation of said workhead under the influence of said torque motor, cyclically operable means to index the workhead through a distance equal to the spacing between adjacent teeth on the cutter, including means to reverse the torque motor and thereby rotate the workhead in a reverse direction, and means controlled by said toothrest upon the passage of a succeeding tooth thereover to again reverse the torque motor and urge the workhead in a forward direction so as to place the succeeding tooth on the toothrest, means rendered effective at the end of each index cycle to initiate a succeeding index cycle, means to produce a signal at the end of a predetermined number of indexed cycles, and means controlled by said signal to disable said initiating means and prevent further indexing of the workhead.

11. The cutter grinder of claim 10 wherein said signal producing means includes a counter adapted to be preset to said predetermined number of index cycles.

12. In an automatic cutter grinder having a bed, a grinding tool mounted on said bed, a table mounted on said bed for movement relative to the grinding tool, and means including a rotatable workhead for supporting a cutter on said table for rotation about its central axis, the combination of cyclically operable means to index the workhead to bring successive cutter teeth into grinding position, means to provide a signal at the end of each complete revolution of the cutter, means controlled by said signal for initiating a series of repeated index cycles of said workhead, means to produce another signal at the end of a predetermined number of the repeated index cycles, and means controlled by said other signal to disable said initiating means and thereby terminate the series of repeated index cycles.

13. In an automatic cutter grinder having a bed, a grinding tool mounted on said bed, a table mounted on said bed for movement relative to the grinding tool, and means including a rotatable workhead for supporting a cutter on said table for rotation about its central axis, the combination of means to move the table back and forth to move the workhead relative to the grinding tool, means to reverse said moving means at the end of each table stroke to provide automatic reciprocation of the table, means effective at the end of the table stroke to interrupt the operation of said table moving means and index the workhead through a distance equal to the spacing between adjacent teeth on the cutter, means to produce a signal at the end of each complete revolution of the cutter with the table at the end of its stroke, means controlled by said signal for initiating a series of repeated index cycles of the workhead, means to produce another signal at the end of a predetermined number of the repeated index cycles, and means controlled by said other signals to disable said initiating means and thereby terminate the series of repeated cycles.

14. In an automatic cutter grinder having a bed, a grinding tool mounted on said bed, a table mounted on said bed for movement relative to the grinding tool, and means including a rotatable workhead for supporting a cutter on said table for rotation about its central axis, the combination of means to move the table back and forth to move the workhead relative to the grinding tool, means to reverse said moving means at the end of each stroke of the table to provide automatic reciprocation of the table, means effective at the end of the table stroke to interrupt the operation of said table moving means and index the workhead through a distance equal to the spacing between adjacent teeth on the cutter, cyclically operable means for truing the grinding tool, selectively settable means for counting the number of indexes of the workhead effected by said index means and for signifying the completion of the last index of a selected number of indexes, and means controlled jointly by said index means and said counting means for initiating a truing cycle after the end of the last index of the workhead.

15. The automatic cutter grinder of claim 14 including means controlled by said truing means for preventing operation of said table moving means until the end of the truing cycle.

16. In an intermittent feed mechanism for advancing an element of a machine tool through any one of a plurality of preselected distances, the combination of a feed member operatively connected with the element to be advanced, a reciprocatory device for giving said feed member an advancing movement on each operation of the device, cyclically operable drive means, a flexible driving connection between said drive means and said reciprocatory device, a plurality of stop members for variably limiting the stroke of said reciprocatory device, and selectively operable means for determining which of said stop members shall be effective to limit the stroke of said device upon the operation of said drive means.

17. The feed mechanism of claim 16 wherein said selectively operable means includes an abutment moving with said reciprocatory device for engagement with said stop members, and means for effecting relative movement between said members and said abutment in a direction normal to that of said abutment whereby said abutment may be aligned with any one of said stop members.

18. The feed mechanism of claim 17 wherein said movement effecting means includes a plurality of actuators each of which is effective, when actuated, to align said abutment with a particular stop member.

19. The feed mechanism of claim 18 wherein said actuators consist of solenoids arranged to be selectively energized.

References Cited in the file of this patent

UNITED STATES PATENTS

| | | |
|---|---|---|
| 2,099,674 | Bullock et al. | Nov. 23, 1937 |
| 2,362,873 | Wessman | Nov. 14, 1944 |
| 2,599,234 | Clark et al. | June 3, 1952 |
| 2,740,236 | Flygare et al. | Apr. 3, 1956 |
| 2,787,094 | French | Apr. 2, 1957 |
| 2,840,958 | Waller | July 1, 1958 |
| 2,903,059 | Nickerson | Sept. 8, 1959 |